US009630872B2

(12) United States Patent
Ishihara et al.

(10) Patent No.: US 9,630,872 B2
(45) Date of Patent: Apr. 25, 2017

(54) METHOD FOR MANUFACTURING GLASS-FINE-PARTICLE-DEPOSITED BODY AND METHOD FOR MANUFACTURING GLASS BASE MATERIAL

(71) Applicant: SUMITOMO ELECTRIC INDUSTRIES, LTD., Osaka-shi, Osaka (JP)

(72) Inventors: Tomohiro Ishihara, Yokohama (JP); Masato Furukawa, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/348,186

(22) PCT Filed: Sep. 28, 2012

(86) PCT No.: PCT/JP2012/075240
§ 371 (c)(1),
(2) Date: Mar. 28, 2014

(87) PCT Pub. No.: WO2013/047834
PCT Pub. Date: Apr. 4, 2013

(65) Prior Publication Data
US 2014/0305168 A1     Oct. 16, 2014

(30) Foreign Application Priority Data

Sep. 29, 2011  (JP) ................................. 2011-214608
Sep. 29, 2011  (JP) ................................. 2011-214780
(Continued)

(51) Int. Cl.
C03B 37/014     (2006.01)

(52) U.S. Cl.
CPC .... *C03B 37/01413* (2013.01); *C03B 37/0142* (2013.01); *C03B 2207/06* (2013.01);
(Continued)

(58) Field of Classification Search
CPC ............ C03B 37/014; C03B 37/01413; C03B 37/01807; C03B 37/01815;
(Continued)

(56) References Cited

U.S. PATENT DOCUMENTS 4,220,460 A *  9/1980  Partus ...................... B01J 4/008
                                                           261/121.1
4,604,118 A *  8/1986  Bocko ................. C03B 19/1415
                                                           427/163.2
(Continued)

FOREIGN PATENT DOCUMENTS

EP         2 463 250 A1      6/2012
JP         A-S55-80732       6/1980
(Continued)

OTHER PUBLICATIONS

Machine Translation of Nunome (JP 2003-252635) obtained at PAJ Jul. 27, 2016.*
(Continued)

*Primary Examiner* — Jason L Lazorcik
(74) *Attorney, Agent, or Firm* — Drinker Biddle & Reath LLP

(57) ABSTRACT

In the method for manufacturing a glass-fine-particle-deposited body according to the present invention, at least a part of a gas supplying pipe 25 from a temperature controlled booth 24 to a burner 18 for cladding is temperature-controlled so that the temperature at the burner side becomes high and temperature gradient becomes 5° C./m or more. The temperature control is performed so that the temperature gradient becomes preferably 15° C./m or more, more pref-
(Continued)

erably 25° C./m or more. Specifically, the part is controlled to the predetermined temperature gradient by winding a tape heater 26 that is a heating element on the outer circumference of the gas supplying pipe 25 from the temperature controlled booth 24 to the burner 18 for cladding and temperature-controlling the tape heater 26.

10 Claims, 7 Drawing Sheets

(30) Foreign Application Priority Data

| | | |
|---|---|---|
| Jan. 5, 2012 | (JP) | 2012-000827 |
| Jan. 18, 2012 | (JP) | 2012-008151 |
| Jan. 18, 2012 | (JP) | 2012-008153 |
| Jan. 18, 2012 | (JP) | 2012-008158 |
| Jan. 18, 2012 | (JP) | 2012-008218 |
| Jan. 18, 2012 | (JP) | 2012-008303 |
| Jan. 24, 2012 | (JP) | 2012-012384 |
| Aug. 7, 2012 | (JP) | 2012-175010 |
| Aug. 7, 2012 | (JP) | 2012-175011 |
| Aug. 7, 2012 | (JP) | 2012-175012 |

(52) U.S. Cl.
CPC ...... *C03B 2207/08* (2013.01); *C03B 2207/20* (2013.01); *C03B 2207/22* (2013.01); *C03B 2207/24* (2013.01); *C03B 2207/81* (2013.01); *Y02P 40/57* (2015.11)

(58) Field of Classification Search
CPC ............ C03B 2207/80; C03B 2207/81; C03B 2207/46; C03B 2207/70; C03B 2207/87
See application file for complete search history.

(56) References Cited

U.S. PATENT DOCUMENTS

| | | | |
|---|---|---|---|
| 2004/0168472 A1 | 9/2004 | Enomoto et al. | |
| 2009/0068605 A1 | 3/2009 | Yoshida | |
| 2013/0045439 A1* | 2/2013 | Maida | C03B 19/1415 430/5 |

FOREIGN PATENT DOCUMENTS

| | | | |
|---|---|---|---|
| JP | S63-222034 A | | 9/1988 |
| JP | A-S63-307137 | | 12/1988 |
| JP | A-H2-102146 | | 4/1990 |
| JP | A-H02-133331 | | 5/1990 |
| JP | A-H03-69527 | | 3/1991 |
| JP | H04-270130 A | | 9/1992 |
| JP | H07-144927 A | | 6/1995 |
| JP | A-H09-175826 | | 7/1997 |
| JP | A-H10-101343 | | 4/1998 |
| JP | H11-180719 A | | 7/1999 |
| JP | A-2000-351634 | | 12/2000 |
| JP | 2001-294429 A | | 10/2001 |
| JP | 2002-160926 A | | 6/2002 |
| JP | 2003-081644 A | | 3/2003 |
| JP | 2003-165737 A | | 6/2003 |
| JP | 2003-252635 A | | 9/2003 |
| JP | 2003252635 A | * | 9/2003 |
| JP | 2004-161555 A | | 6/2004 |
| JP | 2004-210548 A | | 7/2004 |
| JP | 2004-300006 A | | 10/2004 |
| JP | 2006-342031 A | | 12/2006 |
| JP | 2007-230813 A | | 9/2007 |
| JP | A-2011-230986 | | 11/2011 |
| JP | A-2011-230989 | | 11/2011 |
| JP | A-2012-006791 | | 1/2012 |
| WO | WO 99/02459 | | 1/1999 |
| WO | WO 2010/131662 | | 11/2010 |

OTHER PUBLICATIONS

Statement of Patent Opposition issued against Japanese Patent No. 5737241, Opposition No. 2015-700310, on Jan. 20, 2016 (28 pages) with an English Translation (39 pages).

Yasuo Kurosaki et al., "Engineering Heat Transfer," Corona Publishing Co., Ltd., May 7, 2009, pp. 57-58 with an English translation.

Written Patent Opposition dispatched Dec. 11, 2015 in corresponding Japanese Patent No. 5720585 (13 pages)with an English Translation (24 pages).

* cited by examiner

METHOD FOR MANUFACTURING GLASS-FINE-PARTICLE-DEPOSITED BODY AND METHOD FOR MANUFACTURING GLASS BASE MATERIAL

TECHNICAL FIELD

The present invention relates to a method for manufacturing a glass-fine-particle-deposited body in which glass fine particles are deposited on a starting rod by the VAD method (vapor phase axial deposition method), the OVD method (outside vapor deposition method), the MMD method (multi-burner multi-layer deposition method), or the like to manufacture the glass-fine-particle-deposited body, and a method for manufacturing a glass base material in which the glass-fine-particle-deposited body is heated to impart transparency.

BACKGROUND ART

As a conventional method for manufacturing a glass base material, there are known manufacturing methods including a deposition step of preparing a glass-fine-particle-deposited body by the OVD method, the VAD method, or the like and a transparency-imparting step of heating the glass-fine-particle-deposited body to prepare a transparent glass body (base material) (for example, see Patent Documents 1 to 3).

In the manufacturing method of Patent Document 1, a glass source material gas is introduced into a burner for forming glass fine particles through a pipe under reduced pressure with heating and vaporizing a glass source material, so that pipe temperature is, for example, controlled to 55° C. and hence it becomes possible to use a pipe made of a vinyl chloride-based material having a heat-resistant temperature of 70° C.

In the manufacturing method of Patent Document 2, after a glass source material gas is discarded for a predetermined period of time prior to the start of glass fine particle deposition, the deposition of glass fine particles is started and the discarded amount of the source material gas, volume of the pipe, pressure of the pipe inside, and temperature of the pipe are controlled so as to satisfy a predetermined relationship among them, thereby intending to avoid occurrence of air bubbles and cloudiness in the glass base material. The pipe temperature is controlled to be 82° C. or 85° C.

In the manufacturing method of Patent Document 3, as a method for suppressing unevenness which may occur on the surface of the glass-fine-particle-deposited body, it is described to keep the conduit pipe from a source material gas-generating device that supplies the source material gas to the burner at 90° C. or higher all over the length using a heater and a heat insulating material but there exists no description of temperature gradient of the conduit pipe. Also, there is no description of Reynolds number of the source material gas flowing in the pipe. Moreover, there is no description of particle diameter and aggregation of particles. Furthermore, there is no description of Stokes number of the glass fine particles.

In Patent Document 4, as a method for improving a source material yield, there is described a method of introducing a gas into inner circumference of a hood placed at a tip of the burner flame to suppress the spreading of the flame.

Moreover, as a method for manufacturing a glass-fine-particle-deposited body, there is commonly known a method for manufacturing a glass-fine-particle-deposited body by a vapor-phase synthetic method such as the VAD method, the OVD method, or the MMD method. As for the particle diameter of the glass fine particles, for example, in Patent Document 5 in which a porous soot body obtained by the vapor-phase synthetic method is impregnated with a mixed liquid containing additive fine particles dispersed therein and is heated and subjected to transparency impartment to form a glass base material, it is described to control the particle diameter of an $SiO_2$-based porous body to 500 to 1,000 nm.

Patent Document 6 describes a manufacturing method in which glass fine particles prepared previously are introduced into the burner flame. It is described that the average particle diameter of the glass fine particles to be charged is preferably controlled to 0.2 μm or less.

Moreover, Patent Document 7 describes a manufacturing method in which a glass-fine-particle-molded body is sintered by microwave heating, and it is described that the average particle diameter of the glass fine particles is from 1 nm to 100 μm.

BACKGROUND ART DOCUMENTS

Patent Documents

Patent Document 1: JP-A-2004-161555
Patent Document 2: JP-A-2006-342031
Patent Document 3: JP-A-2003-165737
Patent Document 4: JP-A-7-144927
Patent Document 5: JP-A-11-180719
Patent Document 6: JP-A-2004-300006
Patent Document 7: JP-A-2004-210548

However, in the manufacturing methods of a glass base material described in the above Patent Documents 1 to 7, it is difficult to adhere the produced glass fine particles on the starting rod or the glass-fine-particle-deposited body. Namely, there is limitation on the ratio of the deposited amount of the glass fine particles to the supplied amount of the glass source material gas.

An object of the present invention is to provide manufacturing methods of a glass-fine-particle-deposited body and a glass base material, the methods being capable of improving an adhering efficiency of the formed glass fine particles on a starting rod or a glass-fine-particle-deposited body.

SUMMARY OF THE INVENTION

The method for manufacturing a glass-fine-particle-deposited body according to the invention capable of solving the above problem is a method for manufacturing a glass-fine-particle-deposited body, the method comprising a depositing step of heating and vaporizing a liquid glass source material placed in a source material container to form a glass source material gas, introducing the glass source material gas to a burner for producing glass-fine-particles from the source material container through a pipe, spouting the glass source material gas from the burner for producing glass-fine-particles, and depositing glass fine particles produced by a flame decomposition reaction (pyrolysis reaction, flame hydrolysis reaction, thermal oxidation reaction, or the like) of the glass source material gas on a starting rod in a reaction container to prepare a glass-fine-particle-deposited body, wherein at least a part of the pipe from the source material container to the burner for producing glass-fine-particles in the deposition step is temperature-controlled by a heating element so that the burner side has a high temperature and temperature gradient becomes 5° C./m or more.

Moreover, the method for manufacturing a glass-fine-particle-deposited body according to the invention is preferably characterized in that at least a part of the pipe from the source material container to the burner for producing glass-fine-particles in the deposition step is temperature-controlled by a heating element so that the burner side has a high temperature and temperature gradient becomes 15° C./m or more.

Furthermore, the method for manufacturing a glass-fine-particle-deposited body according to the invention is preferably characterized in that at least a part of the pipe from the source material container to the burner for producing glass-fine-particles in the deposition step is temperature-controlled by a heating element so that the burner side has a high temperature and temperature gradient becomes 25° C./m or more.

Additionally, the method for manufacturing a glass-fine-particle-deposited body according to the invention is preferably characterized in that at least a part of the pipe from the source material container to the burner for producing glass-fine-particles in the deposition step is controlled to a temperature of 100° C. or higher by a heating element and also the Reynolds number of the glass source material gas flowing in the pipe from the source material container to the burner for producing glass-fine-particles is controlled to 2,000 or more.

In addition, the method for manufacturing a glass-fine-particle-deposited body according to the invention is preferably characterized in that the particle diameter of the glass fine particles in the deposition step is controlled to 10 (nm) or more and the glass fine particles are combined between the particles in the flame of the burner for producing glass-fine-particles to make the mass of the combined particle group $1.8 \times 10^{-17}$ (g) or more.

Moreover, the method for manufacturing a glass-fine-particle-deposited body according to the invention is preferably characterized in that the temperature of the glass source material gas to be charged into the burner for producing glass-fine-particles in the deposition step is kept at 100° C. or higher, the glass source material gas is chemically changed to silicon oxide gas ($SiO_2$, SiO, etc.) within 700 mm from the glass source material gas-spouting port of the burner for producing glass-fine-particles. At the time, partial pressure of the chemically changed silicon oxide gas is controlled to saturated vapor pressure of the silicon oxide gas ($SiO_2$, SiO, etc.) or higher at the position of 20 mm from the glass source material gas-spouting port of the burner for producing glass-fine-particles. In this connection, the "silicon oxide" described in this specification means a collective term for oxides of silicon, such as $SiO_2$ and SiO.

Furthermore, the method for manufacturing a glass-fine-particle-deposited body according to the invention is preferably characterized in that the partial pressure of the chemically changed silicon oxide gas is controlled to 1.5 times the saturated vapor pressure of the silicon oxide gas at the position of 20 mm from the glass source material gas-spouting port of the burner for producing glass-fine-particles, in the deposition step.

Additionally, the method for manufacturing a glass-fine-particle-deposited body according to the invention is preferably characterized in that at least a part of the pipe from the source material container to the burner for producing glass-fine-particles in the deposition step is controlled to a temperature of 100° C. or higher by a heating element and also the Stokes number of the glass fine particles produced by the burner for producing glass-fine-particles is controlled to 0.5 or more.

In addition, the method for manufacturing a glass-fine-particle-deposited body according to the invention is preferably characterized in that, in the deposition step, at least a part of the pipe from the source material container to the burner for producing glass-fine-particles is controlled to a temperature of 100° C. or higher by a heating element and also the region of one third or less of the longitudinal direction from the end part at the pipe side in the burner for producing glass-fine-particles is controlled to a temperature of 100° C. or higher by a heating element.

Also, the method for manufacturing a glass-fine-particle-deposited body the invention is preferably characterized in that the heating element is a tape heater.

Moreover, the method for manufacturing a glass base material according to the invention is preferably characterized in that a glass-fine-particle-deposited body is manufactured by the above-described method for manufacturing a glass-fine-particle-deposited body and the glass base material is manufactured via a transparency-imparting step in which the glass-fine-particle-deposited body prepared in the deposition step is heated to impart transparency.

Furthermore, the method for manufacturing a glass base material according to the invention is preferably characterized in that the glass-fine-particle-deposited body is manufactured by the OVD method, the VAD method, or the MMD method in the deposition step and the glass base material is manufactured via the transparency-imparting step.

Advantage of the Invention

According to the methods for manufacturing a glass-fine-particle-deposited body and a glass base material, at least a part of the pipe from the source material container to the burner for producing glass-fine-particles is temperature-controlled by a heating element so that the burner side has a high temperature and temperature gradient becomes 5° C./m or more, so that the volume of the source material gas in the pipe expands as the gas flows from the source material container to the burner side and the flow rate of the source material gas is accelerated. Thereby, inertial force of the glass fine particles produced in the burner flame is increased and the straight advancing ability of the glass fine particles is promoted, so that the glass fine particles are prone to drop out of the gas flow in the flame. Accordingly, the adhering efficiency of the glass fine particles on the starting rod and the glass-fine-particle-deposited body can be improved and thus an improvement in the source material yield can be achieved.

Moreover, according to the methods for manufacturing a glass-fine-particle-deposited body and a glass base material, at least a part of the pipe from the source material container to the burner for producing glass-fine-particles is controlled to a temperature of 100° C. or higher by a heating element and also the Reynolds number of the glass source material gas flowing in the pipe from the source material container to the burner for producing glass-fine-particles is controlled to 2,000 or more, whereby the flow of the glass source material gas becomes turbulent and thus the source material gas flowing in the pipe travels a path length longer than the pipe length, so that the heating time of the source material gas is lengthened and the temperature of the source material gas can be easily elevated.

By elevating the temperature of the source material gas, the flame hydrolysis reaction is promoted in the burner flame, the number of the glass fine particles produced in the flame is increased, and the outer diameter of the glass fine particles is also increased. Moreover, the increase in the particle diameter promotes the aggregation (combination between particles) by turbulent diffusion. Owing to these effects, the inertial force of the glass fine particles is increased and the glass fine particles are prone to drop out of the flow of the flame gas, so that the adhering efficiency of the glass fine particles on the starting rod and the glass-fine-particle-deposited body can be improved.

Moreover, according to the methods for manufacturing a glass-fine-particle-deposited body and a glass base material of the invention, the particle diameter of the glass fine particles is controlled to 10 (nm) or more and the glass fine particles are combined between the particles (aggregated) in the flame of the burner for producing glass-fine-particles to make the mass of the combined particle group $1.8 \times 10^{-17}$ (g) or more. Thereby, the adhering efficiency of the produced glass fine particles on the starting rod and the glass-fine-particle-deposited body can be improved.

Furthermore, according to the methods for manufacturing a glass-fine-particle-deposited body and a glass base material of the invention, the temperature of the glass source material gas to be charged into the burner for producing glass-fine-particles is kept at 100° C. or higher, the glass source material gas is chemically changed to silicon oxide gas within 700 mm from the glass source material gas-spouting port of the burner for producing glass-fine-particles, and also partial pressure of the chemically changed silicon oxide gas is controlled to saturated vapor pressure of the silicon oxide gas or higher at the position of 20 mm from the glass source material gas-spouting port of the burner for producing glass-fine-particles. Namely, when the glass source material gas is chemically changed to silicon oxide gas at a position near to the glass source material gas-spouting port of the burner, the partial pressure of the silicon oxide gas increases, so that the change from the silicon oxide gas to silicon oxide particles (solid) becomes easy and also the silicon oxide particles tend to have a larger diameter. When the particles have a larger diameter, the glass fine particles are prone to drop out of the flow of the flame gas, so that the adhering efficiency of the glass fine particles on the starting rod and the glass-fine-particle-deposited body can be improved and thus an improvement in the source material yield can be achieved.

Moreover, according to the methods for manufacturing a glass-fine-particle-deposited body and a glass base material of the invention, at least a part of the pipe from the source material container to the burner for producing glass-fine-particles is controlled to a temperature of 100° C. or higher by a heating element and also the Stokes number of the glass fine particles produced by the burner for producing glass-fine-particles is controlled to 0.5 or more, thereby increasing the inertial force of the glass fine particles. Therefore, the glass fine particles are prone to drop out of the flow of the flame gas, so that the adhering efficiency of the glass fine particles on the starting rod and the glass-fine-particle-deposited body can be improved and thus an improvement in the source material yield can be achieved.

Furthermore, according to the methods for manufacturing a glass-fine-particle-deposited body and a glass base material of the invention, at least a part of the pipe from the source material container to the burner for producing glass-fine-particles is controlled to a temperature of 100° C. or higher by a heating element and also the region of one third or less of the longitudinal direction from the end part at the pipe side in the burner for producing glass-fine-particles is controlled to 100° C. or higher by a heating element, whereby lowering of the temperature of the source material gas in the burner for producing glass fine particles can be prevented.

By elevating the temperature of the source material gas flowing in the burner for producing glass fine particles, the flame hydrolysis reaction is promoted in the burner flame, the number of the glass fine particles formed in the flame is increased, and the outer diameter of the glass fine particles is also increased. Moreover, the increase in the particle diameter promotes the aggregation (combination between particles) by turbulent diffusion. Owing to these effects, the inertial force of the glass fine particles is increased and the glass fine particles are prone to drop out of the flow of the flame gas, so that the adhering efficiency of the glass fine particles on the starting rod and the glass-fine-particle-deposited body can be improved.

BRIEF DESCRIPTION OF THE DRAWINGS

FIG. 6A shows a structural example in which the tips of burners are even and FIG. 6B shows a structural example in which the tips of burners are protruded at the outer circumferential side.

MODE FOR CARRYING OUT THE INVENTION (First Embodiment)

The following describes the methods for manufacturing a glass-fine-particle-deposited body and a glass base material as the first embodiment of the invention with reference to the drawings. Incidentally, explanation is made using the VAD method as an example in the following but the invention is not limited to the VAD method. It is also possible to apply the invention to other methods for manufacturing a glass-fine-particle-deposited body, such as the OVD method and the MMD method.

Figure 1:
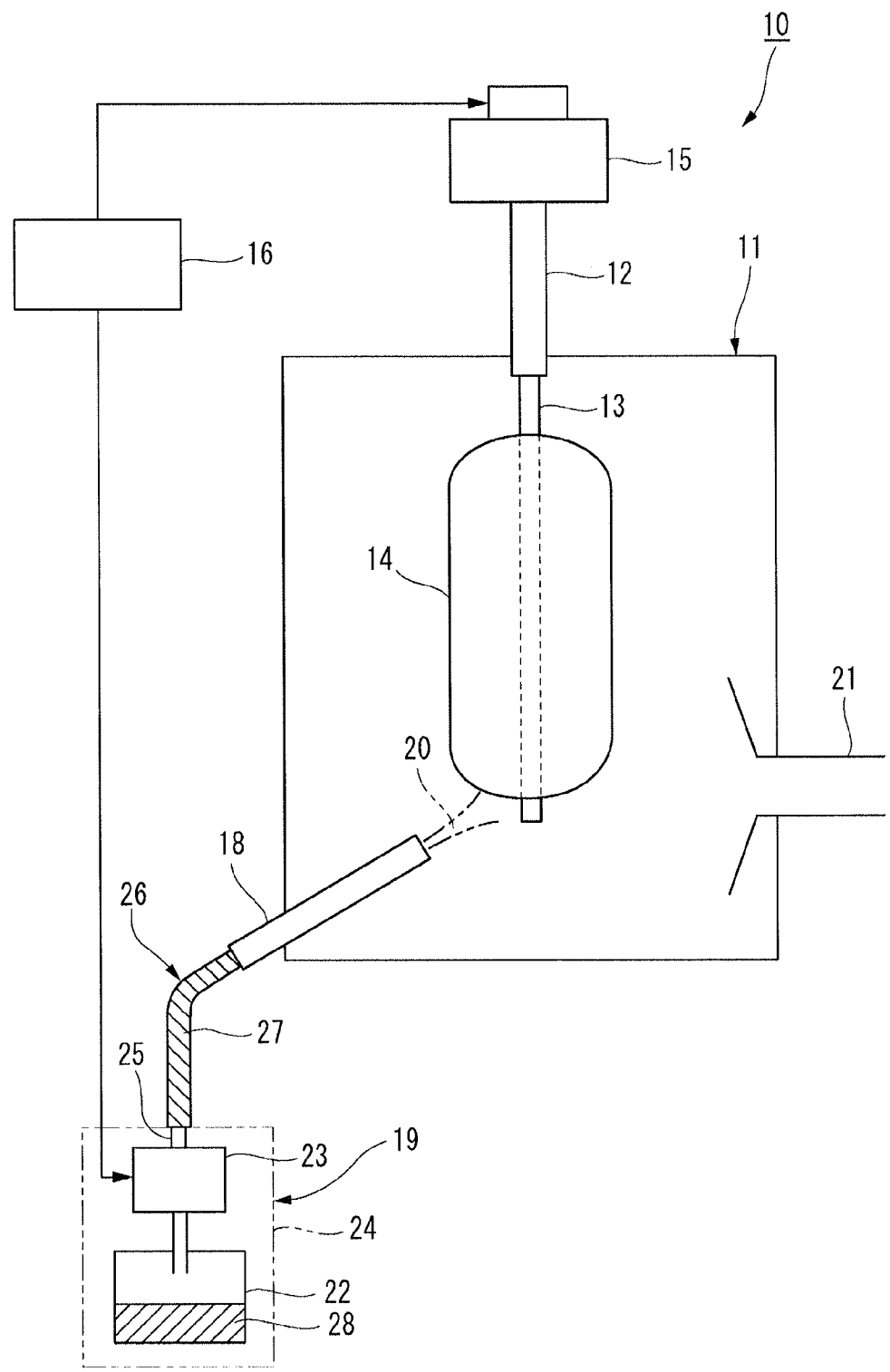
FIG. 1 is a block diagram of a manufacturing equipment for explaining the method for manufacturing a glass-fine-particle-deposited body according to an embodiment of the invention.

As shown in FIG. 1, a manufacturing equipment 10 for carrying out the method for manufacturing a glass-fine-particle-deposited body according to the present embodiment is one for depositing glass fine particles by the VAD method, a supporting rod 12 is suspended inside a reaction container 11 from the above, and a starting rod 13 is attached to the lower end of the supporting rod 12. An exhaust pipe 21 is attached to a side face of the reaction container 11.

The supporting rod 12 is held at the upper end by a lifting and rotating device 15 and is lifted with rotation by the lifting and rotating device 15. The lifting rate of the lifting and rotating device 15 is controlled by a control device 16 so that the outer diameter of a glass-fine-particle-deposited body 14 becomes even. The glass-fine-particle-deposited body 14 is formed by depositing glass fine particles 20 on the starting rod 13. Also, the glass fine particles 20 in the reaction container 11, which are not adhered to the starting rod 13 and the glass-fine-particle-deposited body 14, are discharged through the exhaust pipe 21.

A burner 18 for cladding that is a burner for producing glass-fine-particles is placed at a lower part of the inside of the reaction container 11 and a source material gas and a flame forming gas are supplied to the burner 18 for cladding by a gas supplying device. The burner 18 for cladding is, for example, a multiple pipe burner such as an eightfold pipe one. Incidentally, in FIG. 1, the gas supplying device for supplying the flame forming gas is omitted.

Into the burner 18 for cladding, $SiCl_4$ as a source material gas, $H_2$ and $O_2$ as flame forming gases, $N_2$ as a burner sealing gas, and the like are charged. In the oxyhydrogen flame formed by the burner 18 for cladding, the glass fine particles 20 are produced by a flame hydrolysis reaction, and the glass fine particles 20 are deposited on the starting rod 13 to prepare a glass-fine-particle-deposited body 14 having a predetermined outer diameter.

The gas supplying device 19 comprises a source material container 22 for storing a liquid source material 28, MFC 23 for controlling a supply flow rate of the source material gas, a gas supplying pipe 25 for introducing the source material gas into the burner 18 for cladding, and a temperature controlled booth 24 for keeping the source material container 22, MFC 23, and a part of the gas supplying pipe 25 at a predetermined temperature or higher.

The liquid source material 28 in the source material container 22 is controlled to a temperature of a boiling point (e.g., a standard boiling point is 57.6° C. in the case of $SiCl_4$) or higher in the temperature controlled booth 24 and is vaporized in the source material container 22, and the supply amount of the source material gas to be supplied to the burner 18 for cladding is controlled by MFC 23. In this connection, the control of the supply amount of the source material gas by MFC 23 is conducted based on the command value from a control device 16.

In the method for manufacturing a glass-fine-particle-deposited body of the present embodiment, at least a part of the gas supplying pipe 25 from the source material container 22 to the burner 18 for cladding is temperature-controlled so that the temperature at the burner side becomes high and temperature gradient becomes 5° C./m or more.

At least a part of the gas supplying pipe 25 from the source material container 22 to the burner 18 for cladding is temperature-controlled so as to make the temperature at the burner side high so that the temperature gradient becomes preferably 15° C./m or more, more preferably 25° C./m or more.

As for material of the gas supplying pipe 25, in the case where the gas supplying pipe 25 is held at a temperature lower than 200° C., the material of the gas supplying pipe 25 may be a fluorocarbon resin (Teflon (registered trademark)) or the like but, in the case where it is held at a temperature of 200° C. or higher, the material of the gas supplying pipe 25 is preferably a metallic one such as SUS, which is excellent in heat resistance. Moreover, outer circumference of the gas supplying pipe 25 from the temperature controlled booth 24 to the burner 18 for cladding is wound with a tape heater 26 that is a heating element. The tape heater 26 is a flexible heater in which extrafine twisted wires of a metal heating element or a carbon-made fibrous planar heating element are covered with a protective material. When the tape heater 26 is energized, the gas supplying pipe 25 is heated.

Incidentally, outer circumference of the tape heater 26 is preferably wound with a heat insulating tape 27 that is a heat insulator. When the heat insulating tape 27 is wound, electric power consumption of the tape heater 26 can be suppressed to a low level.

One example of the temperature control of the gas supplying pipe is described.

Figure 2:
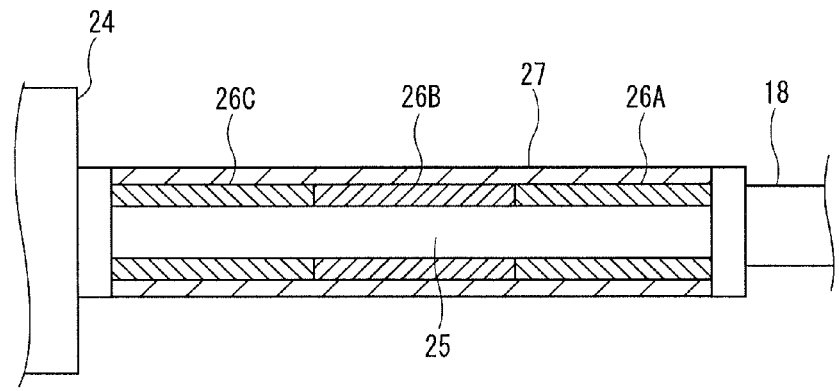
FIG. 2 is an outline view showing one example at the time when temperature gradient is imparted to the gas supplying pipe in FIG. 1.

As shown in FIG. 2, three kinds of tape heaters 26A, 26B, and 26C are wound on the outer circumference of the gas supplying pipe 25 from the temperature controlled booth 24 to the burner 18 for cladding. Namely, the first tape heater 26A is wound at the side of the burner 18 for cladding, the second tape heater 26B is wound so as to be neighboring at the side, and the third tape heater 26C is wound at the temperature controlled booth 24 side. As a matter of convenience, the length of the gas supplying pipe 25 between the temperature controlled booth 24 and the burner 18 for cladding is made 1 m.

For example, thermocouples are placed at both ends and middle of the outer circumference of the gas supplying pipe 25 and respective temperatures are regulated by the tape heaters 26A, 26B, and 26C. At the time, when the temperature of the thermocouple placed at one end of the pipe (temperature controlled booth 24 side) is regulated at 120° C. by the third tape heater 26C, the temperature of the thermocouple placed at the middle of the pipe is regulated at 140° C. by the second tape heater 26C, and the temperature of the thermocouple placed at one end of the pipe (burner 18 side) is regulated at 160° C. by the third tape heater 26C, the pipe is temperature-controlled at a temperature gradient of 40° C./m.

When the gas supplying pipe 25 from the temperature controlled booth 24 to the burner 18 for cladding is temperature-controlled so that the burner side has a high temperature and the temperature gradient becomes 5° C./m or more as mentioned above, the volume of the source material gas in the gas supplying pipe 25 is expanded as the gas advances from the temperature controlled booth 24 to the burner 18 for cladding and the flow rate of the source material gas is accelerated. Incidentally, the constitution with the aforementioned three kinds of tape heaters 26A, 26B, and 26C is one example for realizing the invention but the invention can be realized by another constitution. For example, when a part of the tape heater 26B is controlled so as to be 140° C. and the other tape heaters (26A, 26C) are controlled with the same electric power as the case of the tape heater 26B, an effect can be obtained. Incidentally, it is sufficient that at least a part of the gas supplying pipe 25 is controlled to 5° C./m or more, but the whole pipe may be controlled to 5° C./m or more. Moreover, as a matter of convenience, the length of the gas supplying pipe 25 between the temperature controlled booth 24 and the burner 18 for cladding is made 1 m but the length of the gas supplying pipe 25 can be appropriately adjusted.

Thereby, the inertial force of the glass fine particles 20 produced in the burner flame is increased and the straight advancing ability of the glass fine particles 20 is promoted, so that the glass fine particles 20 are prone to drop out of the gas flow in the flame and the adhering efficiency of the glass fine particles 20 on the starting rod 13 and the glass-fine-particle-deposited body 14 can be improved.

Figure 4:
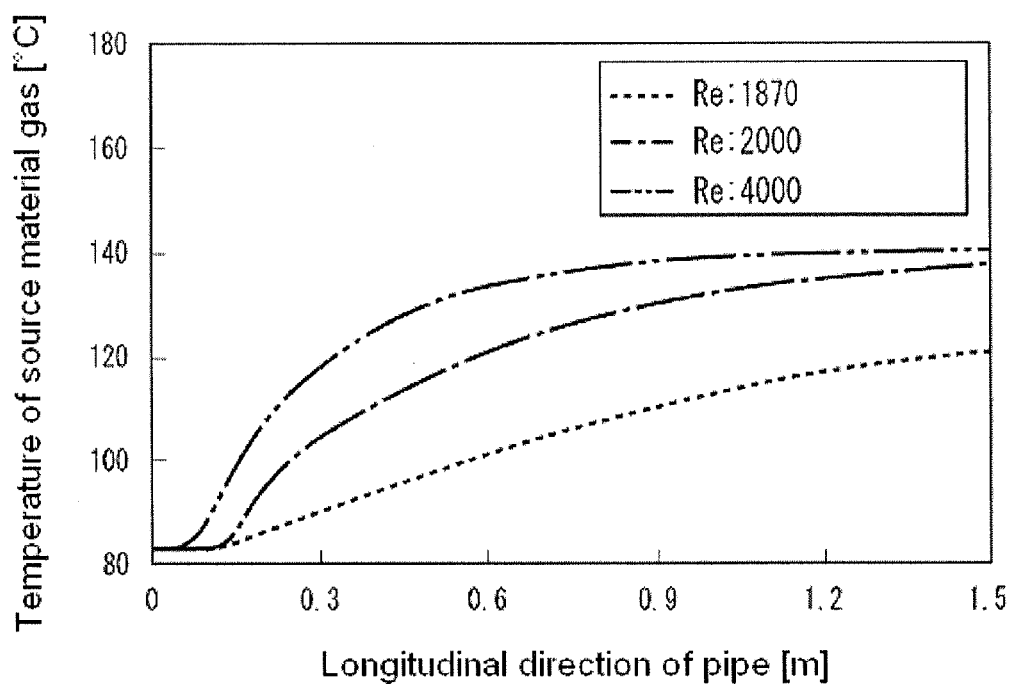
FIG. 4 is a graph showing temperature change of the source material gas at a part of the longitudinal direction at the inside of a gas supplying pipe.

Moreover, the pipe diameter is designed so that the Reynolds number (Re number) of the source material gas flowing in the gas supplying pipe 25 becomes 2,000 or more, preferably 4,000 or more, further preferably 8,000 or more. Thereby, the flow of the source material gas in the gas supplying pipe 25 becomes turbulent and the source material gas is efficiently heated in the gas supplying pipe 25, so that the temperature can be easily elevated. FIG. 4 shows the temperature of the source material gas flowing in the gas supplying pipe 25 in the case where the whole length of the gas supplying pipe 25 is heated at a constant temperature of 140° C. From FIG. 4, it is understood that the source material gas flowing in the gas supplying pipe 25 is easily heated as the Re number increases.

The procedure for manufacturing the glass-fine-particle-deposited body 14 and the glass base material is described.
(Deposition Step)

As shown in FIG. 1, the supporting rod 12 is attached to the lifting and rotating device 15, and the starting rod 13 attached to the lower end of the supporting rod 12 is placed in the reaction container 11.

Then, while the starting rod 13 is rotated by the lifting and rotating device 15, the source material gas is chemically changed to the glass fine particles 20 by the flame hydrolysis reaction in an oxyhydrogen flame formed by the burner 18 for cladding and the glass fine particles 20 are deposited on the starting rod 13.

At the time, by energizing the tape heater 26 wound on the outer circumference of the gas supplying pipe 25, the gas supplying pipe 25 is temperature-controlled so that the temperature thereof is elevated at a slope of 5° C./m or more from the temperature controlled booth 24 toward the burner 18 for cladding.
(Transparency-Imparting Step)

Next, after the resulting glass-fine-particle-deposited body 14 is heated to 1,100° C. in a mixed atmosphere of an inert gas and chlorine gas, the deposited body is further heated to 1,550° C. in an He atmosphere to impart transparency. Such manufacture of the glass base material is repeatedly conducted.

Figure 3:
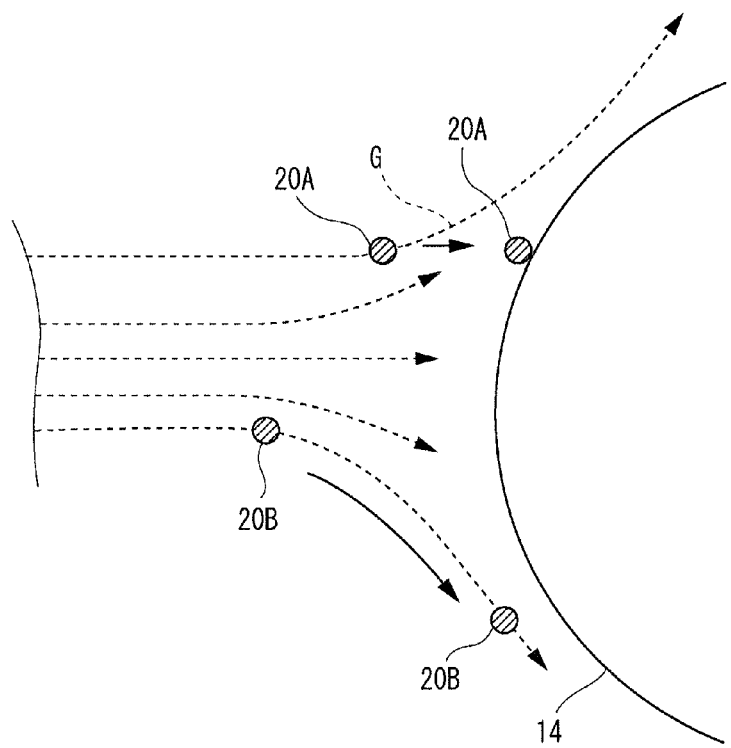
FIG. 3 is a schematic diagram explaining behavior at the time when glass fine particles are deposited on a glass-fine-particle-deposited body.

The behavior of the glass fine particles 20 in the flame gas flow in the deposition step is briefly described. As shown in FIG. 3, a flame gas flow G containing a source material gas such as $SiCl_4$, formed by the burner 18 for cladding, bumps against the glass-fine-particle-deposited body 14 and the flowing direction is sharply curved to the outer circumferential direction of the glass-fine-particle-deposited body 14.

On the other hand, since the glass fine particles flowing along the flame gas flow have higher Stokes number as the flow rate increases, the inertial force of the glass fine particles is increased and the straight advancing ability of the glass fine particles is improved. When the flame gas flow G bumps against the glass-fine-particle-deposited body 14 and the flowing direction is sharply changed to the outer circumferential direction of the glass-fine-particle-deposited body 14, the glass fine particles 20A having a large inertial force have a straight advancing ability, so that the particles bump against the glass-fine-particle-deposited body 14 as they flow. However, since the glass fine particles 20B having a small inertial force flow along the flame gas flow G, the particles flow away in an outer circumferential direction of the glass-fine-particle-deposited body 14. Therefore, it is important how to increase the inertial force of the glass fine particles 20.

In the invention, by imparting temperature gradient to at least a part of the gas supplying pipe 25, the flow rate of the source material gas flowing in the gas supplying pipe 25 is accelerated toward the downstream side of the gas supplying pipe 25 to increase the inertial force of the glass fine particles 20 in the burner flame. Thereby, the glass fine particles are prone to drop out of the flow of the flame gas and the adhering efficiency of the glass fine particles 20 on the starting rod 13 and the glass-fine-particle-deposited body 14 can be improved.

EXAMPLE A

Next, one Example of the method for manufacturing a glass base material of the invention is described.

In both of Example and Comparative Example, the glass base material is manufactured using the following materials.

Starting rod: quartz glass having a diameter of 25 mm and a length of 1,000 mm

Gases charged into burner for cladding: Source material gas . . . $SiCl_4$ (1 to 7 SLM), Flame forming gases . . . $H_2$ (100 to 150 SLM), $O_2$ (100 to 150 SLM), Burner sealing gas . . . $N_2$ (20 to 30 SLM)

Deposition of glass fine particles is performed by the VAD method. After the resulting glass-fine-particle-deposited body is heated to 1,100° C. in a mixed atmosphere of an inert gas and chlorine gas, it is heated to 1,550° C. in an He atmosphere to impart transparency.

The temperature of outer circumference of the gas supplying pipe was measured at three points along a longitudinal direction of the pipe, and the minimum temperature gradient: T (° C./m) between the measuring points and the source material yield of the glass fine particles: X (%) are evaluated. In this connection, the source material yield of the glass fine particles X is taken as a mass ratio of the glass fine particles actually deposited on the starting rod and the glass-fine-particle-deposited body to the $SiO_2$ mass in the case where 100% of the $SiCl_4$ gas to be charged is chemically reacted into $SiO_2$.

Specifically, in Examples, the gas supplying pipe from the temperature controlled booth to the burner for cladding is heated by a heating element such that the burner side has a higher temperature and the minimum temperature gradient is stepwise controlled from 5° C./m to 40° C./m, and the source material yield in each temperature gradient is calculated. Contrarily, in Comparative Examples, temperature gradient is not controlled and the source material yield in the case where the minimum temperature gradient T is less than 5° C./m is calculated.

As a result, results shown in Table 1 are obtained.

TABLE 1

|  | T (° C./m) | X (%) |
| --- | --- | --- |
| Example A-1 | 5 | 32 |
| Example A-2 | 15 | 34 |
| Example A-3 | 25 | 37 |
| Example A-4 | 30 | 39 |
| Example A-5 | 40 | 40 |
| Comparative Example A-1 | 4 | 27 |
| Comparative Example A-2 | 3 | 24 |

As is apparent from Table 1, in Examples A-1 to A-5 in which the minimum temperature gradient T is 5° C./m or more, the source material yield X is 32% or more. Moreover, in the case of Example 5 in which the minimum temperature gradient T is 40° C./m, the temperature of the source material gas immediately before charging into the burner is 270° C., namely the temperature of the source material gas is 212.4° C. higher than the standard boiling point of SiCl$_4$ that is the source material gas and, at the time, the source material yield X is improved to 40%. Contrarily, in Comparative Examples A-1 and A-2, since the minimum temperature gradient T is less than 5° C./m, the source material yield is so low as 27% or less and, in the case of Comparative Example A-2 in which the minimum temperature gradient T is 3° C./m, the source material yield is 24%, so that it is understood that only about one fourth of the SiCl$_4$ gas to be charged is adhered as glass fine particles.

(Second Embodiment)

The following describes methods for manufacturing a glass-fine-particle-deposited body and a glass base material as the second embodiment with reference to Drawings. Since the equipment configuration in the second embodiment is the same as in the first embodiment (FIG. 1), detailed explanations of the equipment configuration, controlling methods, and the like are omitted. For the numbers of devices in the following description, FIG. 1 is referred to.

In the method for manufacturing a glass base material of the present embodiment, at least a part of the gas supplying pipe 25 from the temperature controlled booth 24 to the burner 18 for cladding is controlled to a temperature of 100° C. or higher by the tape heater 26 that is a heating element and also the Reynolds number Re of the source material gas flowing in the gas supplying pipe 25 from the source material container 22 to the burner 18 for cladding is controlled to 2,000 or more. In general, the gas flow flowing in the pipe is a laminar flow in the case where the Reynolds number is less than 2,000, is in a transient region between 2,000 and 4,000, and becomes a turbulent flow in the case where the number is 4,000 or more. Incidentally, in order to promote the flame hydrolysis reaction of the source material gas in the burner flame, it is sufficient that at least a part of the gas supplying pipe 25 is controlled to 100° C. or higher but the whole pipe may be controlled to 100° C. or higher.

The Reynolds number Re of the source material gas flowing in the gas supplying pipe 25 is represented by the following equation when the inner diameter of the pipe is taken as D, the average gas flow rate in the pipe is taken as V, and the coefficient of kinematic viscosity of the gas in the pipe is taken as ν.

$$Re = DV/\nu$$

Incidentally, the coefficient of kinematic viscosity ν of SiCl$_4$ at the temperature of 100° C. is about $3.1 \times 10^{-6}$ (m$^2$/s).

The Reynolds number Re is controlled to preferably 4,000 or more, further preferably 8,000 or more. Thereby, the source material gas flowing through the gas supplying pipe 25 from the source material container 22 to the burner 18 for cladding becomes further turbulent. When the turbulent intensity of the source material gas flowing through the gas supplying pipe 25 is enhanced, the source material gas is charged into the burner 18 for cladding via a path length longer than the pipe length.

Consequently, the source material gas is sufficiently heated by the tape heater 26 in the gas supplying pipe 25 and the temperature is elevated. Thereby, the flame hydrolysis reaction of the source material gas to be spouted from the burner is promoted in the burner flame.

When the flame hydrolysis reaction is promoted in the burner flame, the number of the glass fine particles formed in the flame is increased. Moreover, since the growth of the glass fine particles is advanced, the outer diameter of the glass fine particles also is increased. Furthermore, when the outer diameter is increased, the aggregation (combination between particles) by turbulent diffusion is promoted. Owing to these effects, the inertial force of the glass fine particles in the burner flame is increased, so that the glass fine particles are prone to drop out of the flow of the flame gas and the adhering efficiency of the glass fine particles 20 on the starting rod 13 and the glass-fine-particle-deposited body 14 can be improved.

Since the procedures for manufacturing the glass-fine-particle-deposited body and the glass base material are the same as in the deposition step and the transparency-imparting step of the first embodiment, detailed explanations are omitted. The glass fine particles 20 are deposited on the starting rod 13 shown in FIG. 1 and, thereafter, they are heated in a mixed atmosphere of an inert gas and chlorine gas and heated in an He atmosphere to impart transparency.

In the deposition step in the present embodiment, as for the gas supplying pipe 25 for supplying the source material gas to the burner 18 for cladding, the pipe inner diameter D is designed so that the desired Reynolds number Re is obtained. Moreover, by energizing the tape heater 26 wound on the outer circumference of the gas supplying pipe 25, at least a part of the gas supplying pipe 25 is controlled to a temperature of 100° C. or higher. Thereby, the average flow rate of the source material gas flowing in the pipe is controlled so as to obtain the desired Reynolds number Re.

Namely, in the case where the flow of the source material gas flowing in the gas supplying pipe 25 is made constant, the Reynolds number Re of the source material gas flowing in the pipe can be controlled by changing the pipe inner diameter D of the gas supplying pipe 25 or the temperature of the gas supplying pipe 25. Moreover, when the temperature of the source material gas flowing in the gas supplying pipe 25 is changed, the coefficient of kinematic viscosity of the source material gas is also varied.

The glass-fine-particle-deposited body 14 obtained by deposition of the glass fine particles 20 on the starting rod 13 is lifted up in accordance with the growth rate of the lower end part of the glass-fine-particle-deposited body 14 by means of the lifting and rotating device 15.

As mentioned above, at least a part of the gas supplying pipe 25 from the temperature controlled booth 24 to the burner 18 for cladding is controlled to a temperature of 100° C. or higher by the tape heater 26 that is a heating element and also the Reynolds number of the glass source material gas flowing in the gas supplying pipe 25 from the source material container 22 to the burner 18 for cladding is controlled to 2,000 or more, preferably 4,000 or more, further preferably 8,000 or more.

Thereby, the flow of the source material gas in the gas supplying pipe 25 becomes turbulent, the source material gas is sufficiently heated by the tape heater 26 in the gas supplying pipe 25, and the temperature is elevated. As a result, the flame hydrolysis reaction of the source material gas to be spouted from the burner is promoted in the burner flame.

When the flame hydrolysis reaction is promoted in the burner flame, the number of the glass fine particles formed in the flame is increased. Moreover, since the growth of the glass fine particles is advanced, the outer diameter of the glass fine particles is also increased. Furthermore, when the outer diameter is increased, the aggregation (combination between particles) by turbulent diffusion is promoted. Owing to these effects, the inertial force of the glass fine particles in the burner flame is increased, so that the glass fine particles are prone to drop out of the flow of the flame gas and the adhering efficiency of the glass fine particles 20 on the starting rod 13 and the glass-fine-particle-deposited body 14 can be improved.

Moreover, when the temperature of the source material gas flowing in the gas supplying pipe 25 is elevated, the volume of the source material gas is expanded and the flow rate of the glass fine particles 20 produced in the burner flame is also increased. The inertial force of the glass fine particles 20 flowing along the flame gas flow is determined by the Stokes number. Since the Stokes number is proportional to the flow rate of particles, the temperature of the source material gas in the gas supplying pipe 25 is elevated and, when the flow rate of the glass fine particles 20 is increased, the inertial force of the glass fine particles 20 is increased. Owing to these effects, the adhering efficiency of the glass fine particles 20 on the starting rod 13 and the glass-fine-particle-deposited body 14 can be improved.

EXAMPLE B

Next, one Example of the methods for manufacturing a glass-fine-particle-deposited body and a glass base material of the invention is described. In both of Example and Comparative Example, the glass-fine-particle-deposited body is manufactured using the following materials.

Starting rod: quartz glass having a diameter of 20 mm and a length of 1,000 mm

Gases charged into burner for cladding: Source material gas ... $SiCl_4$ (1 to 3 SLM), Flame forming gases ... $H_2$ (40 to 70 SLM), $O_2$ (40 to 70 SLM), Burner sealing gas ... $N_2$ (8 to 14 SLM)

Gas supplying pipe between source material container and burner for cladding: Pipe temperature: 100° C., 150° C., 260° C., 270° C., Pipe inner diameter: 2.7 to 19 mm Deposition of glass fine particles is performed by the VAD method. After the resulting glass-fine-particle-deposited body is heated to 1,100° C. in a mixed atmosphere of an inert gas and chlorine gas, it is heated to 1,550° C. in an He atmosphere to impart transparency.

In the aforementioned deposition step, the pipe inner diameter D and the pipe temperature of the gas supplying pipe are appropriately selected, the Reynolds number Re is changed, and the Reynolds number Re of the source material gas flowing in the pipe when the flow of the source material gas becomes 3 SLM and the source material yield X (%) of the glass fine particles are evaluated. In this connection, the source material yield X is taken as a mass ratio of the glass fine particles actually deposited on the starting rod and the glass-fine-particle-deposited body to the $SiO_2$ mass in the case where 100% of the $SiCl_4$ gas to be charged is chemically reacted into $SiO_2$.

TABLE 2

|  | Re | X (%) |
|---|---|---|
| Example B-1 | 2004 | 28 |
| Example B-2 | 4008 | 30 |
| Example B-3 | 8253 | 31 |
| Example B-4 | 10408 | 32 |
| Example B-5 | 11546 | 35 |
| Example B-6 | 11554 | 37 |
| Comparative Example B-1 | 1871 | 25 |
| Comparative Example B-2 | 1585 | 24 |
| Comparative Example B-3 | 1477 | 23 |

As is apparent from Table 2, in Examples B-1 to B-6 in which the Reynolds number Re is 2,000 or more, the source material yield X is 28% or more, so that the source material yield X becomes high as Re increases. Particularly, the source material yield X becomes 30% in the case where Re is 4,008, and the source material yield X becomes 31% in the case where Re is 8,253. Moreover, Example B-4 is an example in which the temperature of the gas supplying pipe is 150° C., namely the temperature of the gas supplying pipe is 92.4° C. higher than the standard boiling point of $SiCl_4$ that is the source material gas, where the Re number becomes 10,408 and the source material yield X is improved to 32%. Furthermore, Example B-5 is an example in which the temperature of the gas supplying pipe is 260° C., namely the temperature of the gas supplying pipe is 202.4° C. higher than the standard boiling point of $SiCl_4$ that is the source material gas, where the Re number becomes 11,546 and the source material yield X is increased to 35%. Additionally, Example B-6 is an example in which the temperature gradient of the gas supplying pipe is a slope of 50° C./m with temperature elevation from the source material container toward the burner and the temperature of the gas supplying pipe in the vicinity of the burner is 270° C., namely the temperature of the gas supplying pipe is 212.4° C. higher than the standard boiling point of $SiCl_4$ that is the source material gas. The Re number becomes 11,554 and the turbulent diffusion of the glass fine particles in the flame is promoted owing to the temperature gradient in a longitudinal direction of the gas supplying pipe, so that the source material yield X is jumped to 37%.

Contrarily, in Comparative Examples B-1 to B-3 in which the Reynolds number Re is less than 2,000, the source material yield X is so low as 25% or less. Particularly, in Comparative Example B-3 in which the Reynolds number Re is less than 1,500, the source material yield X is 23%. Thus, in Comparative Examples B-1 to B-3, it is understood that only about one fourth of the $SiCl_4$ gas to be charged is adhered.

Incidentally, FIG. 4 shows the temperature of the source material gas flowing in the gas supplying pipe in the case where the whole length of the gas supplying pipe is heated to a constant value of 140° C. From the figure, it is understood that the temperature is slowly elevated along the longitudinal direction of the pipe in a laminar flow state at which the Reynolds number Re is 1,870 (broken line in the figure) but the temperature is sharply elevated at an upstream side of the pipe in a turbulent flow state at which the Reynolds number Re is 2,000 (dashed line in the figure) or 4,000 (two-dot chain line in the figure). Since the Reynolds number Re is 2,000 or more in Examples B-1 to B-6, the temperature of the source material gas to be charged into the burner is equal to the temperature of the gas supplying pipe in Examples B-1 to B-5 and the temperature of the source material gas to be charged into the burner is equal to the temperature of the gas supplying pipe in the vicinity of the burner in Example B-6.

(Third Embodiment)

The following describes the method for manufacturing a glass base material as the third embodiment of the invention with reference to the drawings. Since the equipment configuration in the third embodiment is also the same as in the first and second embodiments (FIG. 1), detailed explanations of the equipment configuration, controlling methods, and the like are omitted. For the numbers of devices in the following description, FIG. 1 is referred to.

Incidentally, the pipe diameter is designed so that the Reynolds number Re (Re number) of the source material gas flowing in the gas supplying pipe 25 becomes 2,000 or more, preferably 4,000 or more, further preferably 8,000 or more. Thereby, the flow of the source material gas in the gas supplying pipe 25 becomes turbulent and the source material gas is efficiently heated in the gas supplying pipe 25 and the temperature is easily elevated.

Moreover, the temperature distribution in a longitudinal direction of the gas supplying pipe 25 is further preferably controlled so that the temperature increases from the source material container 22 side to the side of the burner 18 for cladding. Specifically, by controlling the temperature gradient of the gas supplying pipe 25 to 5° C./m or more, preferably 15° C./m or more, further preferably 25° C./m or more, it becomes possible to enhance the adhering efficiency of the glass fine particles.

Since the procedures for manufacturing the glass-fine-particle-deposited body 14 and the glass base material are the same as in the deposition step and the transparency-imparting step of the aforementioned embodiment, detailed explanations are omitted. The glass fine particles 20 are deposited on the starting rod 13 shown in FIG. 1 and, thereafter, they are heated in a mixed atmosphere of an inert gas and chlorine gas and heated in an He atmosphere to impart transparency.

In the method for manufacturing a glass base material of the present embodiment, the particle diameter of the glass fine particles is controlled to 10 (nm) or more, preferably 50 (nm), and the glass fine particles are aggregated among the particles in the flame of the burner for producing glass fine particles to make the mass of the aggregated particle group $1.8 \times 10^{-17}$ (g) or more, preferably $2.8 \times 10^{-14}$ (g) or more. The aggregation rate by the turbulent diffusion depends on particle number concentration and is promoted by increasing the particle number concentration. For increasing the particle number concentration, it is appropriate to perform the flame hydrolysis reaction of the source material gas at an upstream side of the flame at which the source material gas is not spread. Specifically, the particle number concentration can be increased by changing 75% or more of the $SiCl_4$ gas into $SiO_2$ gas within 700 mm, preferably within 500 mm, further preferably within 300 mm from the tip of the burner.

When the aggregation is promoted, the inertial mass of the particle group is increased. The particle group having an increased inertial mass is prone to drop out of the gas flow in the flame. Thereby, the particle group of the glass fine particles is prone to adhere to the starting rod and the glass-fine-particle-deposited body as targets and thus the source material yield can be improved.

The behavior of the glass fine particles in the flame gas flow is briefly described.

Figure 5:
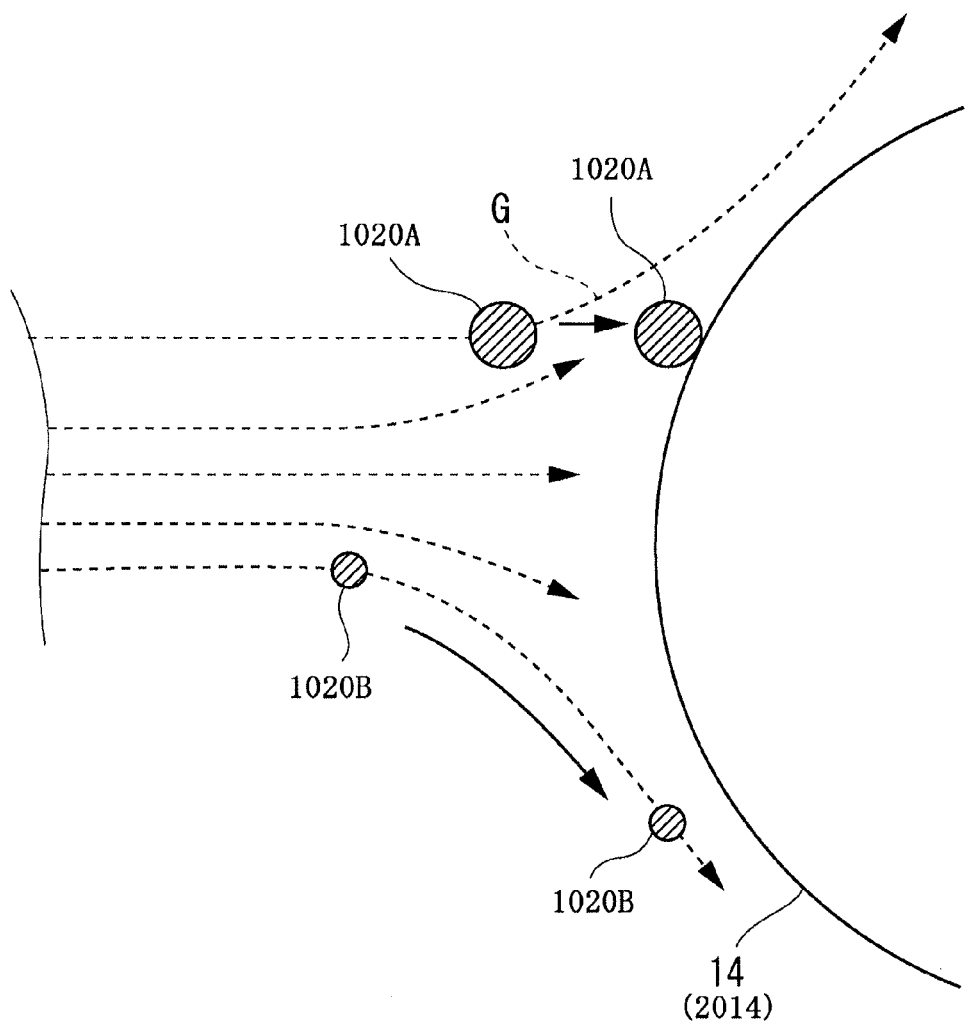
FIG. 5 is a schematic diagram explaining behavior at the time when glass fine particles are deposited on a glass-fine-particle-deposited body.

As shown in FIG. 5, the flame gas flow G containing a source material gas such as $SiCl_4$, formed by the burner 18 for cladding, bumps against the glass-fine-particle-deposited body 14 and the flowing direction is sharply curved to the outer circumferential direction of the glass-fine-particle-deposited body 14.

Here, the glass fine particle group 1020B having a small inertial force follows the flow direction of the flame gas flow G. However, the glass fine particle group 1020A having a large inertial force does not follow the flow direction of the flame gas flow G owing to the improved straight advancing ability and is prone to drop out of the flame gas flow G (see FIG. 5). Therefore, it becomes important how to increase the inertial force of the glass fine particle group.

According to the method for manufacturing a glass base material of the present embodiment, the particle diameter of the glass fine particles is controlled to 10 (nm) or more, and the glass fine particles are aggregated among the particles to make the mass of the aggregated particle group $1.8 \times 10^{-17}$ (g) or more. The aggregation is promoted by the turbulent diffusion, the aggregated particle group is prone to drop out of the flame gas flow, and thus the adhering efficiency of the glass fine particles on the starting rod and the glass-fine-particle-deposited body can be improved.

EXAMPLE C

Next, one Example of the method for manufacturing a glass base material of the invention is described.

In both of Example and Comparative Example, the glass base material is manufactured using the following materials.

Starting rod: quartz glass having a diameter of 25 mm and a length of 1,000 mm

Gases charged into burner for cladding: Source material gas . . . $SiCl_4$ (1 to 7 SLM), Flame forming gases . . . $H_2$ (100 to 150 SLM), $O_2$ (100 to 150 SLM), Burner sealing gas . . . $N_2$ (20 to 30 SLM)

Using the above-described materials, glass fine particles are deposited by the above-described VAD method to manufacture a glass-fine-particle-deposited body. On this occasion, the glass source material yield A (%) of the glass fine particles is evaluated with fluctuating the temperature T of the source material gas to be charged into the burner, the particle diameter D (nm) of the glass fine particles, and the mass M (g) of the particle group.

The particle diameter D of the glass fine particles can be changed by adjusting the temperature T of the source material gas to be charged into the burner and the flow of the flame forming gas. Moreover, as mentioned above, by chemically changing the source material gas ($SiCl_4$) into $SiO_2$ gas at a region near to the source material gas-spouting port of the burner for producing glass fine particles (e.g., a region 20 to 700 mm apart from the source material gas-spouting port), the production and growth of the $SiO_2$ glass fine particles can be promoted. In this connection, the particle diameter D is taken as minimum particle diameter confirmed on an electron microscope (SEM) and the temperature of the source material gas means the temperature of the source material gas immediately before charging into the burner.

The glass source material yield A of the glass fine particles is taken as a mass ratio of the glass fine particles actually deposited on the starting rod and the glass-fine-particle-deposited body to the $SiO_2$ mass in the case where 100% of the $SiCl_4$ gas to be charged is chemically reacted into $SiO_2$.

After the resulting glass-fine-particle-deposited body is heated to 1,100° C. in a mixed atmosphere of an inert gas and chlorine gas, the deposited body is further heated to 1,550° C. in an He atmosphere to impart transparency. As a result, results as shown in Table 3 are obtained.

TABLE 3

|  | Temperature of source material gas T (° C.) | Particle diameter D (nm) | Mass M of particle group (g) | Glass source material yield A (%) |
| --- | --- | --- | --- | --- |
| Example C-1 | 100 | 10 | 1.843E−17 | 46.2 |
| Example C-2 | 110 | 20 | 2.949E−16 | 51.4 |
| Example C-3 | 150 | 50 | 2.880E−14 | 53.8 |
| Example C-4 | 200 | 70 | 1.549E−13 | 55.0 |
| Example C-5 | 260 | 77 | 2.061E−13 | 56.2 |
| Example C-6 | 170 | 50 | 2.304E−13 | 58.6 |

TABLE 3-continued

| | Temperature of source material gas T (° C.) | Particle diameter D (nm) | Mass M of particle group (g) | Glass source material yield A (%) |
|---|---|---|---|---|
| Comparative Example C-1 | 90 | 7 | 6.322E−18 | 41.6 |
| Comparative Example C-2 | 85 | 5 | 2.304E−18 | 41.2 |
| Comparative Example C-3 | 80 | 3 | 4.976E−19 | 40.3 |

As is apparent from Table 3, in Examples C-1 to C-6 in which the temperature T of the source material gas is 100° C. or higher, namely the temperature of the source material gas is 42.4° C. or more higher than the standard boiling point of $SiCl_4$ that is the source material gas, the particle diameter of the glass fine particles is 10 nm or more, and the mass M of the particle group is $1.8 \times 10^{-17}$ (g) or more, the source material yields A become high as compared with the cases of Comparative Examples C-1 to C-3 in which the temperature T of the source material gas is lower than 100° C., the particle diameter of the glass fine particles is less than 10 nm, and the mass M of the particle group is less than $1.8 \times 10^{-17}$ (g). Moreover, as the particle diameter D and the mass M of the particle group increase, the glass source material yield A increases. In Example C-5 in which the temperature T of the source material gas is 260° C., namely the temperature of the source material gas is 202.4° C. higher than the standard boiling point of $SiCl_4$ that is the source material gas, the particle diameter of the glass fine particles is 77 nm or more, and the mass M of the particle group is $2.06 \times 10^{-13}$ (g), the glass source material yield A becomes 56.2%. Furthermore, Example C-6 is an example in which the temperature gradient of the gas supplying pipe is a slope of 20° C./m with temperature elevation from the source material container to the burner and the temperature of the source material gas to be charged into the burner is elevated to 170° C. Although the particle diameter D is smaller than in Example C-5, the turbulent diffusion of the glass fine particles in the flame is promoted owing to the effect of the temperature gradient in a longitudinal direction of the gas supplying pipe, so that the mass M of the particle group becomes larger than in Example C-5 and the glass source material yield A is jumped to 58.6%.

(Fourth Embodiment)

The following describes the method for manufacturing a glass base material as the fourth embodiment of the invention with reference to the drawings. Since the equipment configuration in the forth embodiment is also the same as in the first to third embodiments (FIG. 1), detailed explanations of the equipment configuration, controlling methods, and the like are omitted. For the numbers of devices in the following description, FIG. 1 is referred to.

Figure 6A:
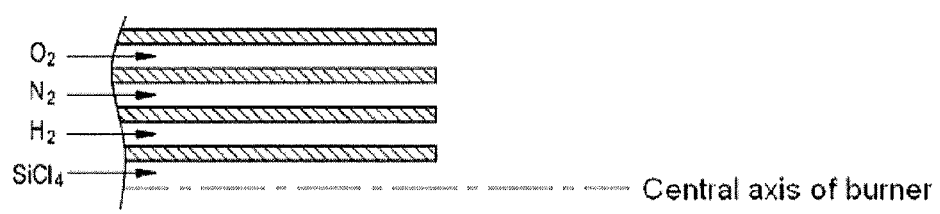
FIGS. 6A and 6B are cross-sectional views showing a structural example of a burner.
Figure 6B:
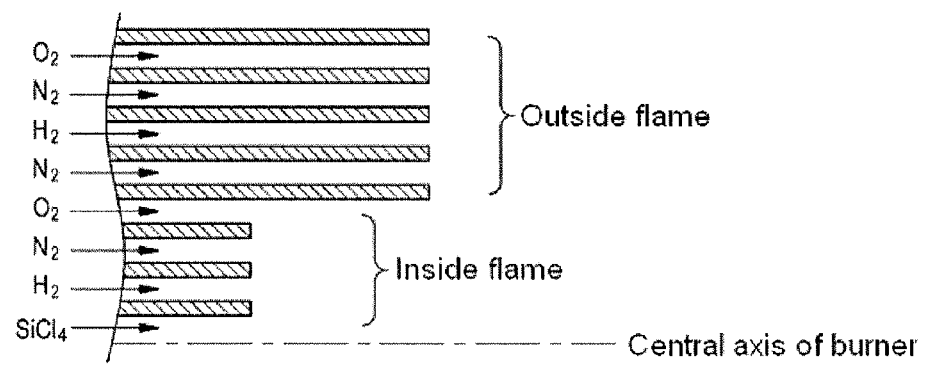

Incidentally, the burner 18 for cladding is, for example, a multiple pipe burner such as eightfold pipe one and, as shown in FIG. 6B, is preferably a multiple pipe burner having a protrusion structure. The multiple pipe burner having a protrusion structure can form an inside flame at the burner central axis side and can form an outside flame at the more outer circumference of the inside flame. The outside multiple pipes which form the outside flame is formed so that the length of the outside multiple pipes is longer toward the side of the source material gas-spouting port than the length of the inside multiple pipes which form the inside flame.

When the outside multiple pipes are more protruded toward the side of the source material gas-spouting port than the inside multiple pipes are, the silicon oxide gas becomes difficult to diffuse in a limited volume to be inside of the protruded portion and thus the partial pressure of the silicon oxide gas is easily increased. Thereby, the reaction of the silicon oxide gas to the silicon oxide particles can be promoted. In this connection, even in the case of a usual multiple pipe burner as shown in FIG. 6A in which the source material gas-spouting ports are flush in length, it is suitable so long as the partial pressure of the silicon oxide gas can be heightened. Incidentally, FIGS. 6A and 6B are longitudinal cross-sectional views showing only a part of the burner tip side, and only one side toward the central axis of the burner is shown in the figures.

In the method for manufacturing a glass base material of the present embodiment, the temperature of the source material gas ($SiCl_4$) to be charged into the burner 18 for cladding is kept at 100° C. or higher and the source material gas is chemically changed to silicon oxide gas within 700 mm from the source material gas-spouting port of the burner 18 for cladding. At the time, the partial pressure of the chemically changed silicon oxide gas is controlled to the saturated vapor pressure of the silicon oxide gas or higher at the position of 20 mm from the glass source material gas-spouting port of the burner 18 for cladding.

Thereby, the reaction of the silicon oxide gas to the silicon oxide particles can be efficiently advanced. Namely, since the source material gas is not diffused to a diameter direction at a position near to the burner 18 for cladding, when the glass source material gas is chemically changed to the silicon oxide gas at a position near to the glass source material gas-spouting port of the burner 18 for cladding, the partial pressure of the silicon oxide gas increases and the change from the silicon oxide gas to silicon oxide particles that are solid becomes easy. Simultaneously, since the growth of the silicon oxide particles is promoted, the silicon oxide particles tend to have a large diameter.

On the other hand, since the source material gas spouted from the burner 18 for cladding diffuses as it goes away from the burner 18 for cladding, the partial pressure of the silicon oxide gas formed at a position apart from the burner 18 for cladding is difficult to increase. Accordingly, even when the silicon oxide gas is formed at a position apart from the burner 18 for cladding, the partial pressure of the silicon oxide gas is low, so that it is difficult to change the silicon oxide gas into the silicon oxide particles and also the particle diameter difficultly grows.

The temperature of the glass source material gas to be introduced into the burner 18 for cladding is preferably kept at 150° C. or higher and the source material gas is preferably chemically changed into the silicon oxide gas within 670 mm from the source material gas-spouting port of the burner 18 for cladding.

Furthermore, the temperature of the glass source material gas is preferably kept at 200° C. or higher and the source material gas is preferably chemically changed into the silicon oxide gas within 650 mm from the source material gas-spouting port of the burner 18 for cladding.

Moreover, the temperature of the glass source material gas is further preferably kept at 300° C. or higher and the source material gas is preferably chemically changed into the silicon oxide gas within 620 mm from the source material gas-spouting port of the burner 18 for cladding.

Also, the partial pressure of the chemically changed silicon oxide gas is preferably controlled to preferably 1.5 times or more, further preferably 2 times or more the saturated vapor pressure of the silicon oxide gas at the position of 20 mm from the source material gas-spouting port of the burner 18 for cladding. In this connection, at a position less than 20 mm from the source material gas-spouting port of the burner 18 for cladding, since the temperature of the source material gas is low, the chemical reaction of the source material gas to the silicon oxide gas also difficultly occurs.

Incidentally, the position at which the source material gas is changed into the silicon oxide gas and the partial pressure of the silicon oxide gas produced in the flame of the burner 18 for cladding can be controlled also by the flow of the flame forming gases ($H_2$, $O_2$) in addition to the temperature of the source material gas to be charged into the burner 18 for cladding. Moreover, also, when the burner 18 for cladding is made to have a multiple flame structure to thereby form a protrusion structure in which the inside flame near to the source material gas-spouting port is surrounded with multiple circular pipes, the partial pressure of the silicon oxide gas produced in the flame can be increased.

When the partial pressure of the silicon oxide gas produced in the flame is increased as above, the number of the glass fine particles 20 produced by the burner 18 for cladding can be increased and the growth of the particle diameter can be promoted. When the particle diameter grows, the inertial force of the glass fine particles 20 increases and the glass fine particles 20 are prone to drop out of the gas flow without following the flame gas flow. Thereby, the glass fine particles 20 are prone to adhere to the starting rod 13 and the glass-fine-particle-deposited body 14 and thus the adhering efficiency can be improved.

Since the procedure for manufacturing the glass base material is the same as the deposition step and the transparency-imparting step of the aforementioned embodiments, detailed explanations are omitted. The glass fine particles 20 are deposited on the starting rod 13 shown in FIG. 1 and, thereafter, they are heated in a mixed atmosphere of an inert gas and chlorine gas and heated in an He atmosphere to impart transparency.

In the deposition step in the present embodiment, by energizing the tape heater 26 wound on the outer circumference of the gas supplying pipe 25 that supplies the source material gas to the burner 18 for cladding, at least a part of the gas supplying pipe 25 is temperature-controlled at an appropriate temperature of 100° C. or higher and the temperature of the source material gas to be charged into the burner 18 for cladding is kept at preferably 100° C. or higher, preferably 150° C. or higher, more preferably 200° C. or higher, further preferably 300° C. or higher. Moreover, the source material gas is chemically changed into the silicon oxide gas within 700 mm, preferably within 670 mm, more preferably within 650 mm, further preferably within 620 mm from the source material gas-spouting port of the burner 18 for cladding. At the time, the partial pressure of the chemically changed silicon oxide gas is controlled to the saturated vapor pressure of the silicon oxide gas or more, preferably 1.5 times or more, more preferably 2 times or more, further preferably 10 times or more the saturated vapor pressure of the silicon oxide gas in the vicinity of 20 mm from the source material gas-spouting port of the burner 18 for cladding.

As mentioned above, the temperature of the source material gas to be charged into the burner 18 for cladding is kept at 100° C. or higher, and the source material gas is chemically changed into the silicon oxide gas within 700 mm from the source material gas-spouting port of the burner 18 for cladding. At the time, the partial pressure of the chemically changed silicon oxide gas is controlled to the saturated vapor pressure of the silicon oxide gas or more at the position of 20 mm from the source material gas-spouting port of the burner 18 for cladding.

By the controlling as above, the change of the silicon oxide gas to the silicon oxide particles that are solid is prone to occur in the flame of the burner 18 for cladding. Simultaneously, since the growth of the silicon oxide particles is promoted, the particle diameter becomes large. Thereby, the inertial force of the glass fine particles 20 is increased and the glass fine particles 20 are prone to drop out of the flame gas flow. Therefore, the glass fine particles 20 are prone to adhere to the starting rod 13 and the glass-fine-particle-deposited body 14 and thus the adhering efficiency can be improved.

EXAMPLE D

Next, one Example of the method for manufacturing a glass base material according to the invention is described.

In both of Example and Comparative Example, the glass base material is manufactured using the following materials.

Starting rod: quartz glass having a diameter of 25 mm and a length of 1,000 mm

Gases charged into burner for cladding: Source material gas . . . $SiCl_4$ (1 to 7 SLM), Flame forming gases . . . $H_2$ (100 to 150 SLM), $O_2$ (100 to 150 SLM), Burner sealing gas . . . $N_2$ (20 to 30 SLM)

Deposition of glass fine particles is performed by the VAD method. After the resulting glass-fine-particle-deposited body is heated to 1,100° C. in a mixed atmosphere of an inert gas and chlorine gas, it is heated to 1,550° C. in an He atmosphere to impart transparency.

In the aforementioned deposition step, the temperature T (° C.) of the source material gas to be charged into the burner, the distance X (mm) from the source material gas-spouting port of the burner to the position at which 100% of the source material gas is chemically changed into the silicon oxide gas, and the pressure ratio Y of the partial pressure of the silicon oxide gas at the position of 20 mm from the source material gas-spouting port of the burner/the saturated vapor pressure of the silicon oxide gas are fluctuated, and the source material yield A (%) is evaluated.

Incidentally, the source material yield A is taken as a mass ratio of the glass fine particles actually deposited on the starting rod and the glass-fine-particle-deposited body to the $SiO_2$ mass in the case where 100% of the $SiCl_4$ gas to be charged is chemically reacted into $SiO_2$. Moreover, as for the burner structure, a usual multiple pipe burner as shown in FIG. 6A is taken as "1" and a multiple pipe burner having a protrusion structure as shown in FIG. 6B is taken as "2". Results are shown in Table 4.

TABLE 4

|  | T (° C.) | X (mm) | Y | Burner structure | A (%) |
|---|---|---|---|---|---|
| Example D-1 | 100 | 700 | 1.03 | 1 | 53.8 |
| Example D-2 | 150 | 670 | 1.14 | 1 | 56.1 |
| Example D-3 | 200 | 650 | 1.20 | 1 | 57.3 |
| Example D-4 | 300 | 620 | 1.34 | 1 | 60.0 |
| Example D-5 | 350 | 600 | 1.50 | 1 | 64.4 |
| Example D-6 | 300 | 600 | 1.50 | 2 | 64.4 |
| Example D-7 | 300 | 590 | 1.60 | 2 | 67.0 |
| Example D-8 | 350 | 570 | 2.00 | 2 | 73.0 |
| Comparative Example D-1 | 90 | 720 | 0.98 | 1 | 49.8 |

TABLE 4-continued

| | T (° C.) | X (mm) | Y | Burner structure | A (%) |
|---|---|---|---|---|---|
| Comparative Example D-2 | 85 | 740 | 0.94 | 1 | 49.4 |
| Comparative Example D-3 | 80 | 760 | 0.90 | 1 | 49.0 |

As is apparent from Table 4, in Examples D-1 to D-8 in which the temperature T of the source material gas is controlled to 100° C. or higher, namely the temperature of the source material gas is controlled to 42.4° C. or more higher than the standard boiling point of SiCl₄ that is the source material gas, the reaction distance X is 700 mm or less, and the pressure ratio Y is 1 or more, it is understood that the source material yield A is so high as 53.8% or more. Particularly, in Example D-5 in which the temperature T of the source material gas is 350° C., namely the temperature of the source material gas is controlled to 292.4° C. higher than the standard boiling point of SiCl₄ that is the source material gas, and the reaction distance X is 600 mm, it is understood that the pressure ratio Y is so high as 1.5 and the source material yield A is also so high as 64.4%. Moreover, in Example D-6 in which the multiple pipe burner having a protrusion structure is used, even when the temperature T of the source material gas is 50° C. lower than in Example D-5, a high source material yield A the same as in Example D-5 can be obtained. Furthermore, Example D-7 is an example in which the temperature gradient of the gas supplying pipe is a slope of 50° C./m with temperature elevation from the source material container toward the burner and the temperature T of the source material gas is controlled to 300° C. Owing to the effect of imparting the temperature gradient in a longitudinal direction of the gas supplying pipe, the turbulent diffusion of the source material gas in the flame is promoted, so that the reaction distance X is shortened to 590 mm, the pressure ratio Y is increased to 1.6, and the source material yield A is jumped to 67%. Moreover, Example D-8 is an example in which the temperature gradient of the gas supplying pipe is a slope of 63° C./m with temperature elevation from the source material container to the burner and the temperature T of the source material gas is controlled to 350° C. The reaction distance X is shortened to 570 mm, the pressure ratio Y is increased to 2, and the source material yield A is improved to 73%.

Contrarily, in Comparative Examples D-1 to D-3 in which the temperature T of the source material gas is controlled to a temperature of less than 100° C., the reaction distance X is larger than 700 mm, and the pressure ratio Y is less than 1, it is understood that the source material yield A is as low as less than 50% and thus a half or more of the SiCl₄ gas to be charged is not adhered.

(Fifth Embodiment)

The following describes the methods for manufacturing a glass-fine-particle-deposited body and a glass base material as the fifth embodiment of the invention with reference to the drawings. Since the equipment configuration in the fifth embodiment is also the same as in the first to fourth embodiments (FIG. 1), detailed explanations of the equipment configuration, controlling methods, and the like are omitted. For the numbers of devices in the following description, FIG. 1 is referred to.

In the method for manufacturing a glass-fine-particle-deposited body according to the present embodiment, at least a part of the gas supplying pipe 25 from the temperature controlled booth 24 to the burner 18 for cladding is controlled to a temperature of 100° C. or higher by the tape heater 26 that is a heating element and also the Stokes number S of the glass fine particles 20 produced by the burner 18 for cladding is controlled to 0.5 or more.

The Stokes number S of the glass fine particles 20 in a flame gas is represented by the following equation when the particle density is taken as p, the particle diameter is taken as d, the particle velocity is taken as u, the coefficient of viscosity of the flame gas is taken as μ, and the diameter of the glass-fine-particle-deposited body is taken as L.

$$S = \rho d^2 u / 18 \mu L$$

The above Stokes number S is controlled to preferably 1.0 or more, further preferably 1.5 or more. By the controlling as above, the inertial force of the glass fine particles 20 produced by the burner 18 for cladding can be further increased.

When the inertial force of the glass fine particles 20 is increased, the straight advancing ability of the glass fine particles 20 is promoted, so that they do not follow the flame gas flow and are prone to drop out of the flame gas flow. Thereby, the glass fine particles 20 are prone to adhere to the starting rod 13 and the glass-fine-particle-deposited body 14 and thus the adhering efficiency can be improved.

Specifically, by controlling at least a part of the gas supplying pipe 25 to a temperature of 100° C. or higher by the tape heater 26 that is a heating element, the source material gas is heated in the gas supplying pipe 25 and the particle velocity u of the glass fine particles 20 spouted from the burner 18 for cladding is increased. Incidentally, it is sufficient to control at least a part of the gas supplying pipe 25 to a temperature of 100° C. or higher but the whole length of the pipe may be controlled to 100° C. or higher.

When the source material gas is controlled to a high temperature, the flame hydrolysis reaction of the source material gas (SiCl₄+2H₂O->SiO₂+4HCl) proceeds at a flame upstream side where the flame is not spread by controlling, so that the partial pressure of the SiO₂ gas can be increased at the flame upstream side. Thereby, the number of the glass fine particles 20 produced in the burner flame is increased and simultaneously, since the growth of the glass fine particles 20 is advanced, the outer diameter of the glass fine particles 20 is also increased. Thus, by controlling the source material gas to be charged into the burner 18 for cladding to a high temperature, the particle velocity u of the glass fine particles 20 is increased and also it becomes possible to make the particle diameter d large, so that the Stokes number. S can be increased.

Since the procedures for manufacturing the glass-fine-particle-deposited body and the glass base material is the same as the deposition step and the transparency-imparting step of the aforementioned embodiments, detailed explanations are omitted. The glass fine particles 20 are deposited on the starting rod 13 shown in FIG. 1 and, thereafter, they are heated in a mixed atmosphere of an inert gas and chlorine gas and heated in an He atmosphere to impart transparency.

In the deposition step in the present embodiment, by energizing the tape heater 26 wound on the outer circumference of the gas supplying pipe 25 that supplies the source material gas to the burner 18 for cladding, at least a part of the gas supplying pipe 25 is temperature-controlled to an appropriate temperature of 100° C. or higher.

As above, at least a part of the gas supplying pipe 25 from the temperature controlled booth 24 to the burner 18 for cladding is controlled to a temperature of 100° C. or higher by the tape heater 26 that is a heating element and also the source material gas flowing in the gas supplying pipe 25 is heated by the tape heater 26 so that the Stokes number S of the glass fine particles 20 produced by the burner 18 for cladding becomes 0.5 or more, preferably 1.0 or more, further preferably 1.5 or more.

By the controlling as above, the glass fine particles 20 spouting from the burner 18 for cladding have an increased inertial force and thus are prone to drop out of the gas flow of the burner flame. Therefore, the adhering efficiency of the glass fine particles 20 on the starting rod 13 and the glass-fine-particle-deposited body 14 can be improved.

EXAMPLE E

Next, one Example of the method for manufacturing a glass base material according to the invention is described.

In both of Example and Comparative Example, the glass base material is manufactured using the following materials.

Starting rod: quartz glass having a diameter of 25 mm and a length of 1,000 mm

Gases charged into burner for cladding: Source material gas . . . $SiCl_4$ (1 to 7 SLM), Flame forming gases . . . $H_2$ (100 to 150 SLM), $O_2$ (100 to 150 SLM), Burner sealing gas . . . $N_2$ (20 to 30 SLM)

Deposition of glass fine particles is performed by the VAD method. After the resulting glass-fine-particle-deposited body is heated to 1,100° C. in a mixed atmosphere of an inert gas and chlorine gas, it is heated to 1,550° C. in an He atmosphere to impart transparency.

In the aforementioned deposition step, by heating the source material gas flowing in the gas supplying pipe 25, the particle velocity u of the glass fine particles 20 produced in the burner flame can be increased and also, since the reaction of the source material is promoted, the particle diameter d of the glass fine particles can be made large. By the controlling as above, the Stokes number S can be changed.

By changing the pipe temperature (° C.) of the gas supplying pipe, the source material yield X (%) at the time is evaluated with fluctuating the average particle diameter and the Stokes number. Incidentally, the source material yield X is taken as a mass ratio of the glass fine particles actually deposited on the starting rod and the glass-fine-particle-deposited body to the $SiO_2$ mass in the case where 100% of the $SiCl_4$ gas to be charged is chemically reacted into $SiO_2$. Moreover, the average particle diameter is calculated from the surface area value of the particles measured by the BET surface area measurement method. Results are shown in Table 5. Incidentally, the gas supplying pipe temperature is an outer circumference temperature of the gas supplying pipe in the vicinity of the burner and the temperature is equal to the temperature of the source material gas to be charged into the burner.

TABLE 5

| | Gas supplying pipe temperature (° C.) | Average particle diameter (nm) | Stokes number S | Source material yield X (%) |
|---|---|---|---|---|
| Example E-1 | 200 | 140 | 1.58 | 55 |
| Example E-2 | 100 | 82 | 0.54 | 27 |
| Example E-3 | 100 | 85 | 0.58 | 29 |
| Example E-4 | 150 | 134 | 1.44 | 53 |
| Example E-5 | 130 | 115 | 1.06 | 45 |
| Example E-6 | 250 | 150 | 1.81 | 58 |
| Example E-7 | 220 | 145 | 1.69 | 57 |
| Example E-8 | 250 | 155 | 2.06 | 64 |
| Example E-9 | 270 | 165 | 2.19 | 66 |
| Example E-10 | 300 | 175 | 2.84 | 70 |

TABLE 5-continued

| | Gas supplying pipe temperature (° C.) | Average particle diameter (nm) | Stokes number S | Source material yield X (%) |
|---|---|---|---|---|
| Comparative Example E-1 | 97 | 82 | 0.49 | 25 |
| Comparative Example E-2 | 94 | 81 | 0.48 | 24 |
| Comparative Example E-3 | 92 | 80 | 0.47 | 23 |

As is apparent from Table 5, in Examples E-1 to E-9 in which the gas supplying pipe temperature is controlled to 100° C. or higher, namely the gas supplying pipe temperature is controlled to 42.4° C. or more higher than the standard boiling point of $SiCl_4$ that is the source material gas and the Stokes number S is 0.5 or more, the source material yield X of the glass fine particles is 27% or more and the source material yield X increases as the Stokes number S increases. Particularly, in the case where the gas supplying pipe temperature is controlled to 130° C., namely the gas supplying pipe temperature is controlled to 72.4° C. higher than the standard boiling point of $SiCl_4$ that is the source material gas and the Stokes number S is 1.06, the source material yield X becomes 45%. Moreover, in the case where the gas supplying pipe temperature is controlled to 250° C., namely the gas supplying pipe temperature is controlled to 192.4° C. higher than the standard boiling point of $SiCl_4$ that is the source material gas and the Stokes number S is 1.81, the source material yield X becomes 58%.

Example E-8 is an example in which the temperature of the gas supplying pipe is elevated at a slope of 44° C./m from the source material container toward the burner and, owing to the effect of imparting the temperature gradient in a longitudinal direction of the gas supplying pipe, the flow rate of the glass fine particles produced in the flame is further increased and the source material yield X is raised to 64%. Furthermore, Example E-9 is an example in which the temperature of the gas supplying pipe is elevated at a slope of 50° C./m from the source material container toward the burner and the gas supplying pipe temperature is controlled to 270° C., namely the gas supplying pipe temperature is controlled to 212.4° C. higher than the standard boiling point of $SiCl_4$ that is the source material gas, where the Stokes number S becomes 2.19 and the source material yield X is improved to 66%. Moreover, Example E-10 is an example in which the temperature of the gas supplying pipe is elevated at a slope of 65° C./m from the source material container toward the burner and the gas supplying pipe temperature is controlled to 300° C., namely the gas supplying pipe temperature is controlled to 242.4° C. higher than the standard boiling point of $SiCl_4$ that is the source material gas, where the Stokes number S becomes 2.84 and the source material yield X is jumped to 70%. Also, in Examples E-1, E-3, E-4, E-5, E-6, E-7, E-8, E-9, and E-10 in which the average particle diameter is controlled to 85 nm or more, the source material yield X becomes 29% or more and the source material yield X increases as the particle diameter increases. Incidentally, there is an effect that the source material yield X increases as the Stokes number S increases but the source material yield X tends to be saturated when the Stokes number exceeds 100.

On the other hand, in Comparative Examples E-1 to E-3 in which the gas supplying pipe temperature is lower than 100° C. and the Stokes number S is less than 0.5, the source material yield X of the glass fine particles is so low as 25% or less. Thus, in Comparative Examples E-1 to E-3, it is understood that only about one fourth of the $SiCl_4$ gas to be charged is adhered.

(Sixth Embodiment)

The following describes the methods for manufacturing a glass-fine-particle-deposited body and a glass base material as the sixth embodiment of the invention with reference to the drawings. In this connection, the sixth embodiment is described with reference to FIG. 7 but, as for the contents the same as the contents described in the first to fifth embodiments, detailed explanations thereof are omitted.

Figure 7:
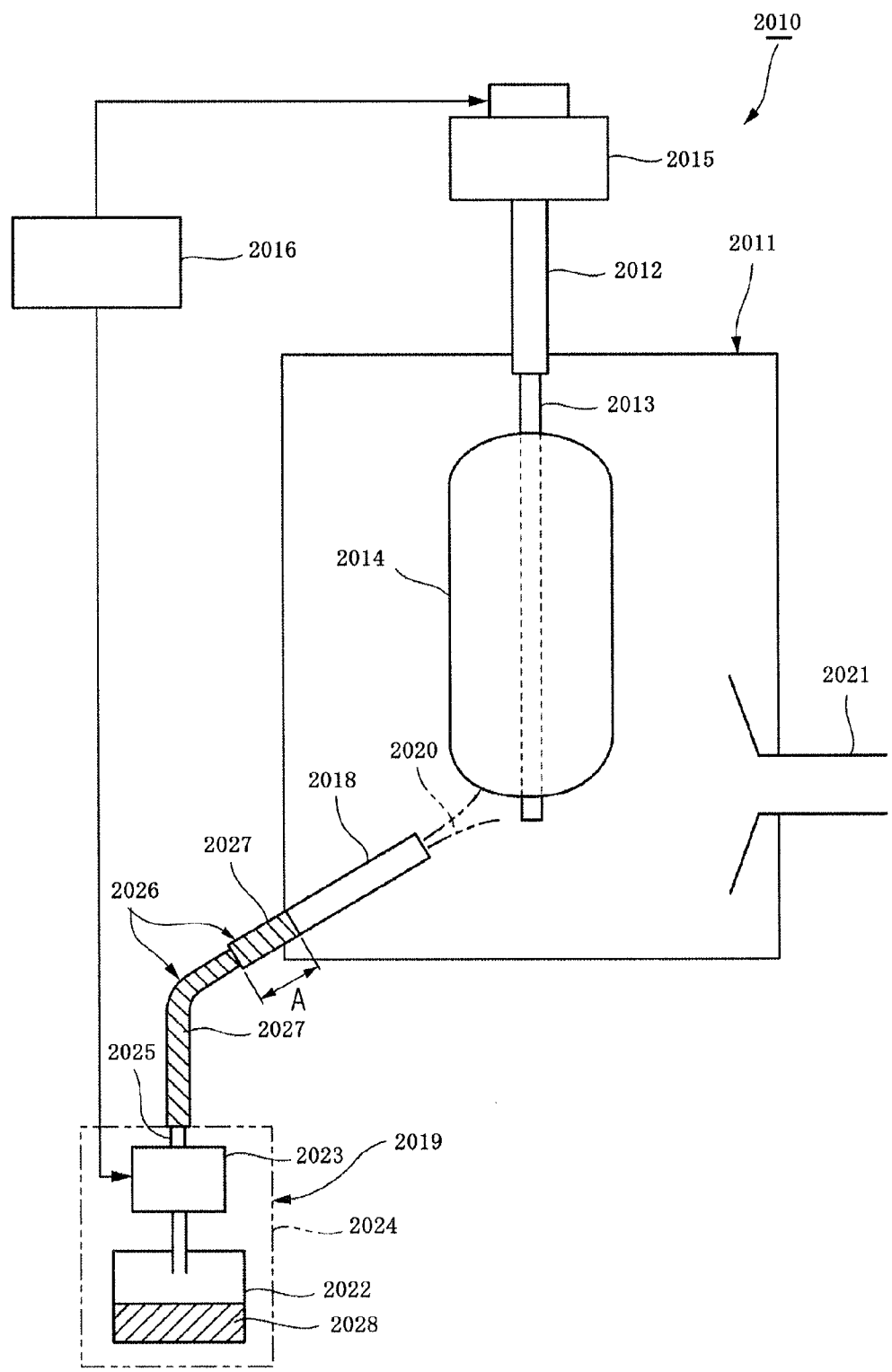
FIG. 7 is a block diagram of one example of a manufacturing equipment for carrying out the method for manufacturing a glass-fine-particle-deposited body according to the sixth embodiment of the invention.

As shown in FIG. 7, a manufacturing equipment 2010 for carrying out the method for manufacturing a glass-fine-particle-deposited body according to the present embodiment is one for depositing glass fine particles by the VAD method, a supporting rod 2012 is suspended inside a reaction container 2011 from the above, and a starting rod 2013 is attached to the lower end of the supporting rod 2012.

The supporting rod 2012 is held by a lifting and rotating device 2015 and the lifting rate is controlled by a control device 2016. A burner 2018 for cladding that is a burner for producing glass fine particles is placed at a lower part of the reaction container 2011 and spouts the glass fine particles 2020 toward the starting rod 2013 to form a glass-fine-particle-deposited body 2014. Also, the glass fine particles 2020 in the reaction container 2011, which are not adhered to the starting rod 2013 and the glass-fine-particle-deposited body 2014, are discharged through an exhaust pipe 2021.

A source material gas and a flame forming gas are supplied to the burner 2018 for cladding by a gas supplying device 2019.

The gas supplying device 2019 comprises a source material container 2022 for storing a liquid source material 2028, MFC 2023 for controlling a supply flow rate of the source material gas, a gas supplying pipe 2025 for introducing the source material gas into the burner 2018 for cladding, and a temperature controlled booth 2024 for keeping the source material container 2022, MFC 2023, and a part of the gas supplying pipe 2025 at a predetermined temperature or higher.

In the method for manufacturing a glass-fine-particle-deposited body of the present embodiment, at least a part of the gas supplying pipe 2025 from the temperature controlled booth 2024 to the burner 2018 for cladding is controlled to a temperature of 100° C. or higher by a tape heater 2026 that is a heating element and also the region A of one third or less of the longitudinal direction from the end part at the gas supplying pipe 2025 side in the burner 2018 for cladding is controlled to a temperature of 100° C. or higher by a heating element. As the heating element, for example, a tape heater is used.

Incidentally, for promoting the flame hydrolysis reaction of the source gas in the burner flame, it is sufficient that at least a part including a connecting portion with the burner 2018 for cladding in the gas supplying pipe 2025 is controlled so as to be 100° C. or higher but the whole pipe may be controlled to be 100° C. or higher.

Also, the temperature of the temperature controlled region of the gas supplying pipe 2025 and the region A of one third or less of the longitudinal direction from the end part at the gas supplying pipe 2025 side in the burner 2018 for cladding is preferably controlled so as to be 150° C. or higher, and is controlled so as to be more preferably 260° C. or higher, further preferably 300° C. or higher.

By the controlling as above, the temperature of the source material gas spouted from the source material container 2022 into the burner flame through the burner 2018 for cladding is elevated and the flame hydrolysis reaction of the source material gas in the burner flame can be promoted.

When the flame hydrolysis reaction is promoted in the burner flame, the number of the glass fine particles produced in the flame is increased. Moreover, since the growth of the glass fine particles 20 is advanced, the outer diameter of the glass fine particles is also increased. Furthermore, the increase in the particle diameter promotes the aggregation (combination between particles) by turbulent diffusion. Owing to these effects, the inertial force of the glass fine particles in the burner flame is increased and the glass fine particles are prone to drop out of the flow of the flame gas, so that the adhering efficiency of the glass fine particles 2020 on the starting rod 2013 and the glass-fine-particle-deposited body 2014 can be improved.

As for material of the gas supplying pipe 2025, in the case where the gas supplying pipe 2025 is held at a temperature lower than 200° C., the material of the gas supplying pipe 2025 may be a fluorocarbon resin (Teflon (registered trademark)) or the like but, in the case where it is held at a temperature of 200° C. or higher, the material of the gas supplying pipe 2025 is preferably a metallic one such as SUS, which is excellent in heat resistance. Moreover, the outer circumference of the gas supplying pipe 2025 from the temperature controlled booth 2024 to the burner 2018 for cladding and the region A of one third or less of the longitudinal direction from the end part at the gas supplying pipe 2025 side in the burner 2018 for cladding is wound with a tape heater 2026 that is a heating element. The tape heater 2026 is a flexible heater in which extrafine twisted wires of a metal heating element or a carbon-made fibrous planar heating element are covered with a protective material. When the tape heater 2026 is energized, the gas supplying pipe 2025 and the burner 2018 for cladding are heated.

Moreover, the inner diameter of the gas supplying pipe 2025 is designed so that the Reynolds number (Re number) of the source material gas flowing in the gas supplying pipe 2025 and the burner 2018 for cladding becomes 2,000 or more, preferably 4,000 or more, further preferably 8,000 or more. Thereby, the flow of the source material gas in the gas supplying pipe 2025 becomes turbulent and the source material gas is efficiently heated in the gas supplying pipe 2025, so that the temperature can be easily elevated.

Incidentally, the outer circumference of the portion having been wound with the tape heater 2026 is preferably wound with a heat insulating tape 2027 that is a heat insulator. When the heat insulating tape 2027 is wound thereon, electric power consumption of the tape heater 2026 can be suppressed to a low level.

Moreover, the temperature distribution in a longitudinal direction of the gas supplying pipe 2025 and the burner 2018 for cladding is preferably controlled so that the temperature elevates from the source material container 2022 toward the burner 2018 for cladding. Specifically, by controlling the temperature gradient of the gas supplying pipe 2025 to 5° C./m or more, preferably 15° C./m or more, further preferably 25° C./m or more, it becomes possible to enhance the adhering efficiency of the glass fine particles 2020.

The procedures for manufacturing the glass-fine-particle-deposited body and the glass base material are described.

(Deposition Step)

As shown in FIG. 7, the supporting rod 2012 is attached to the lifting and rotating device 2015, and the starting rod 13 attached to the lower end of the supporting rod 12 is placed in the reaction container 2011. Then, while the starting rod 2013 is rotated by the lifting and rotating device 2015, the source material gas is chemically changed to the glass fine particles 2020 by the flame hydrolysis reaction in an oxyhydrogen flame formed by the burner 2018 for cladding and the glass fine particles 2020 are deposited on the starting rod 2013.

At the time, at least a part including a connecting portion with the burner 2018 for cladding in the gas supplying pipe 2025 from the temperature controlled booth 2024 to the burner 2018 for cladding and the region A of one third or less of the longitudinal direction from the end part at the gas supplying pipe 2025 side in the burner 2018 for cladding is controlled by the tape heater 2026 so as to be a temperature of 100° C. or higher.

For further promoting the flame hydrolysis reaction in the burner flame, the gas supplying pipe 2025 and the region A of one third or less of the longitudinal direction from the end part at the gas supplying pipe 2025 side in the burner 2018 for cladding are controlled so as to be a temperature of 150° C. or higher, preferably 260° C. or higher, further preferably 300° C. or higher. By the controlling as above, the adhering efficiency of the glass fine particles 2020 produced in the flame of the burner 2018 for cladding on the starting rod 2013 and the glass-fine-particle-deposited body 2014 can be improved.

The glass-fine-particle-deposited body 2014 obtained by deposition of the glass fine particles 2020 on the starting rod 2013 is lifted up in accordance with the growth rate of the lower end part of the glass-fine-particle-deposited body 2014 by means of the lifting and rotating device 2015.
(Transparency-Imparting Step)

Next, after the resulting glass-fine-particle-deposited body 2014 is heated to 1,100° C. in a mixed atmosphere of an inert gas and chlorine gas, the deposited body is heated to 1,550° C. in an He atmosphere to impart transparency. Such manufacture of the glass base material is repeatedly conducted.

As mentioned above, at least a part of the gas supplying pipe 2025 from the temperature controlled booth 2024 to the burner 2018 for cladding and the region A of one third or less of the longitudinal direction from the end part at the gas supplying pipe 2025 side in the burner 2018 for cladding are controlled by the tape heater 2026 that is a heating element so as to be a temperature of 100° C. or higher.

Moreover, as for the heating range of the burner 2018 for cladding, it is sufficient to heat the range of one third or less of the longitudinal direction from the end part at the gas supplying pipe 2025 side. Even when a range wider than one third is heated, there is no effect of further elevating the temperature of the source material gas flowing in the burner. This is because the temperature is sufficiently elevated at the range other than one third from the end part at the gas supplying pipe 2025 side of the burner 2018 for cladding owing to radiant heat from the flame formed in the burner. Although a most suitable heating range is determined depending on the burner structure, the structure of the reaction container, and the like but when the region of one third or less from the end part at the gas supplying pipe 2025 side of the burner 2018 for cladding is heated, there is achieved an effect of keeping the source material gas flowing in the burner at a high temperature even when the equipment structure is any one.

Thereby, the flame hydrolysis reaction of the source material gas spouted from the burner 2018 for cladding is promoted in the burner flame.

When the flame hydrolysis reaction is promoted in the burner flame, the number of the glass fine particles 2020 formed in the flame is increased. Moreover, since the growth of the glass fine particles is advanced, the outer diameter of the glass fine particles is also increased. Furthermore, the increase in the particle diameter promotes the aggregation (combination between particles) by turbulent diffusion. Owing to these effects, the inertial force of the glass fine particles 2020 is increased and the glass fine particles 2020 are prone to drop out of the flow of the flame gas, so that the adhering efficiency of the glass fine particles 2020 on the starting rod 2013 and the glass-fine-particle-deposited body 2014 can be improved.

Moreover, when the temperature of the source material gas flowing in the gas supplying pipe 2025 and the burner 2018 for cladding is elevated, the volume of the source material gas is expanded and the flow rate of the glass fine particles 2020 produced in the burner flame is also increased. The inertial force of the glass fine particles 2020 is determined by the Stokes number. Since the Stokes number is proportional to the flow rate of particles, the temperature of the source material gas in the burner 2018 for cladding is elevated and, when the flow rate of the glass fine particles 2020 is increased, the inertial force of the glass fine particles 2020 is increased. Owing to these effects, the adhering efficiency of the glass fine particles 2020 on the starting rod 2013 and the glass-fine-particle-deposited body 2014 can be improved.

EXAMPLE F

Next, one Example of the methods for manufacturing a glass-fine-particle-deposited body and a glass base material of the invention is described. In both of Example and Comparative Example, the glass-fine-particle-deposited body is manufactured using the following materials.

Starting rod: quartz glass having a diameter of 20 mm and a length of 1,000 mm

Gases charged into burner for cladding: Source material gas . . . $SiCl_4$ (1 to 7 SLM), Flame forming gases . . . $H_2$ (100 to 150 SLM), $O_2$ (100 to 150 SLM), Burner sealing gas . . . $N_2$ (20 to 30 SLM)

Deposition of glass fine particles is performed by the VAD method. After the resulting glass-fine-particle-deposited body is heated to 1,100° C. in a mixed atmosphere of an inert gas and chlorine gas, it is heated to 1,550° C. in an He atmosphere to impart transparency.

In the aforementioned deposition step, the pipe temperature A (° C.) and the burner temperature B (° C.) are appropriately selected and the source material yield X (%) is evaluated. In this connection, the source material yield X is taken as a mass ratio of the glass fine particles actually deposited on the starting rod and the glass-fine-particle-deposited body to the $SiO_2$ mass in the case where 100% of the $SiCl_4$ gas to be charged is chemically reacted into $SiO_2$. Moreover, the pipe temperature A is taken as an outer circumference temperature of the gas supplying pipe in the vicinity of the burner and the burner temperature B is taken as an outer circumference temperature at the position of one third of the longitudinal direction from the end part at the gas supplying pipe 2025 side in the burner for cladding. In Examples F-1 to F-5, the region until one third of the longitudinal direction from the end part at the gas supplying pipe 2025 side in the burner for cladding is heated and, in Example F-6, the region until one eighth of the longitudinal direction from the end part at the gas supplying pipe 2025 side in the burner for cladding is heated.

As a result, results as shown in Table 6 are obtained.

TABLE 6

| | Pipe temperature A (° C.) | Burner temperature B (° C.) | Source material yield X (%) |
|---|---|---|---|
| Example F-1 | 100 | 100 | 55 |
| Example F-2 | 200 | 200 | 60 |
| Example F-3 | 260 | 260 | 64 |
| Example F-4 | 300 | 300 | 67 |
| Example F-5 | 300 | 330 | 69 |
| Example F-6 | 300 | 290 | 66.8 |
| Comparative Example F-1 | 100 | 85 | 50 |
| Comparative Example F-2 | 90 | 75 | 48 |
| Comparative Example F-3 | 80 | 65 | 47 |

As is apparent from Table 6, in Examples F-1 to F-6 in which the pipe temperature A and the burner temperature B are controlled to 100° C. or higher, the source material yield X becomes 55% or more, so that the source material yield X increases as the pipe temperature A and the burner temperature B are elevated. Particularly, in Example F-4 in which the pipe temperature A and the burner temperature B are 300° C., namely the pipe temperature A and the burner temperature B are 242.2° C. higher than the standard boiling point of $SiCl_4$ that is the source material gas, the source material yield X becomes 67%. Moreover, Example F-5 is an example in which the temperature gradient in a longitudinal direction of the gas supplying pipe and the burner for cladding is a slope of 70° C./m with temperature elevation from the source material container side toward the side of the burner for cladding and the burner temperature is 330° C., namely the burner temperature is 272.4° C. higher than the standard boiling point of $SiCl_4$ that is the source material gas. Owing to the effect of imparting the temperature gradient in a longitudinal direction of the gas supplying pipe and the burner for cladding, the turbulent diffusion of the glass fine particles in the flame is promoted and the source material yield X is jumped to 69%. Furthermore, in Example F-6, the pipe temperature is 300° C., the heating range of the burner is controlled to one eighth, and the outer circumference temperature at the position of one third of the longitudinal direction from the end part at the gas supplying pipe 2025 side in the burner is controlled to 290° C. When Example F-4 is compared with Example F-6, it is understood that the source material yield X is slightly decreased but almost the same source material yield is obtained by narrowing the heating rage of the burner from one third to one eighth.

Contrarily, in Comparative Examples F-1 to F-3 in which the burner is not heated, the burner temperature B is less than 100° C. and the source material yield X is decreased to 50% or less. Particularly, in Comparative Example F-3 in which the pipe temperature is 80° C. and the burner temperature is 65° C., the source material yield X is decreased until 47%. Incidentally, in Examples F-1 to F-6 and Comparative Examples F-1 to F-3, the burner temperature B becomes almost equal to the temperature of the source material gas flowing in the burner for cladding.

Figure 8:
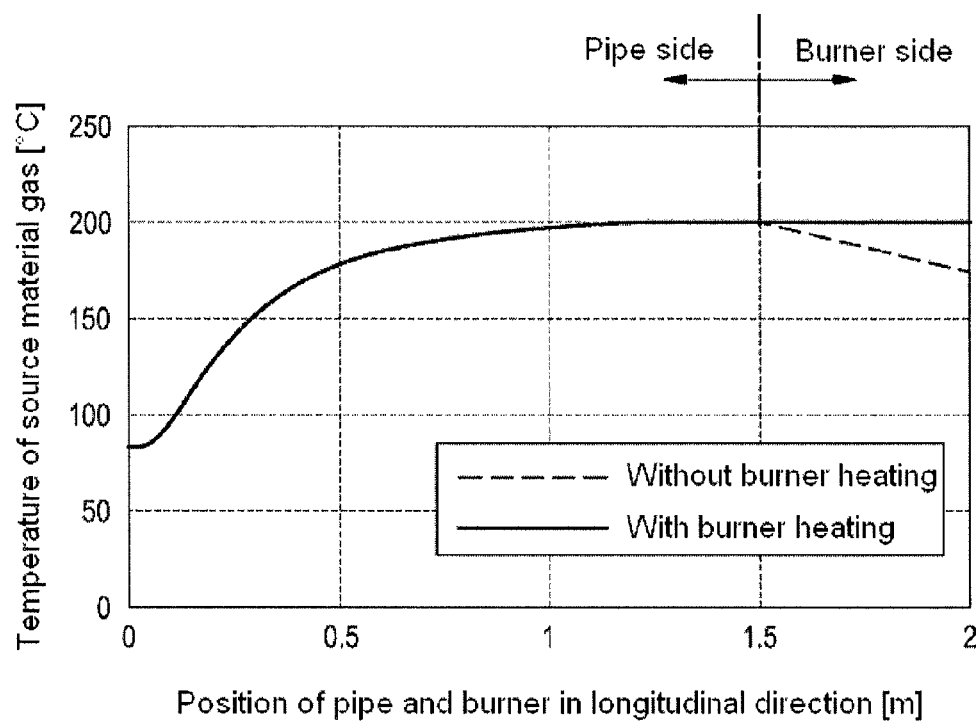
FIG. 8 is a graph showing temperature change of the source material gas at a part of the longitudinal direction at the inside of a gas supplying pipe and a burner for producing glass fine particles.

FIG. 8 is a graph showing temperature change of the source material gas at a part of the longitudinal direction at the inside of the gas supplying pipe and the burner for producing glass fine particles. The data shown by a broken line indicates the case where the whole length of the gas supplying pipe is heated to 200° C. but the burner is not heated. In this case, it is understood that the temperature of the source material gas is lowered in the burner. On the other hand, the data shown by a solid line indicates the case where the whole length of the gas supplying pipe and the region of one third of the longitudinal direction from the end part at the gas supplying pipe side in the burner are heated to 200° C. In this case, it is understood that the temperature of the source material gas flowing in the burner is not lowered.

Incidentally, the methods for manufacturing a glass-fine-particle-deposited body and a glass base material of the invention are not limited to the aforementioned embodiments, and modification, improvement, and the like may be appropriately made at will. For example, in the present embodiments, the case where the glass-fine-particle-deposited body is manufactured by the VAD method in the deposition step is described as one example but the manufacturing methods are effective for all the methods for manufacturing a glass-fine-particle-deposited body and a glass base material utilizing a flame decomposition reaction such as the OVD method or the MMD method.

Moreover, in the present embodiments, only $SiCl_4$ is used as the source material gas but the case of core glass synthesis using $SiCl_4$ and $GeCl_4$ also exhibits an effect of improving the source material yield. Furthermore, a certain source material gas other than $SiCl_4$ (e.g., siloxane or the like) also affords the same effect.

Besides, the material, shape, size, numerical value, form, number, located place, and the like of each constitutional element in the aforementioned embodiments are arbitrary and are not limited so long as they can accomplish the invention.

While the invention has been described in detail and with reference to specific embodiments thereof, it will be apparent to one skilled in the art that various changes and modifications can be made therein without departing from the spirit and scope thereof.

The present application is based on Japanese Patent Application No. 2011-214608 filed on Sep. 29, 2011, Japanese Patent Application No. 2011-214780 filed on Sep. 29, 2011, Japanese Patent Application No. 2012-000827 filed on Jan. 5, 2012, Japanese Patent Application No. 2012-008151 filed on Jan. 18, 2012, Japanese Patent Application No. 2012-008153 filed on Jan. 18, 2012, Japanese Patent Application No. 2012-008158 filed on Jan. 18, 2012, Japanese Patent Application No. 2012-008218 filed on Jan. 18, 2012, Japanese Patent Application No. 2012-008303 filed on Jan. 18, 2012, Japanese Patent Application No. 2012-012384 filed on Jan. 24, 2012, Japanese Patent Application No. 2012-175010 filed on Aug. 7, 2012, Japanese Patent Application No. 2012-175011 filed on Aug. 7, 2012, and Japanese Patent Application No. 2012-175012 filed on Aug. 7, 2012, and the contents are incorporated herein by reference.

DESCRIPTION OF REFERENCE NUMERALS AND SIGNS

10, 2010: Manufacturing equipment, 11, 2011: Reaction container, 12, 2012: Supporting rod, 13, 2013: Starting rod, 14, 2014: Glass-fine-particle-deposited body, 15, 2015: Lifting and rotating device, 16, 2016: Control device, 18, 2018: Burner for cladding, 19, 2019: Gas supplying device, 20, 1020A, 1020B, 2020: Glass fine particles, 22, 2022: Source material container, 23, 2023: MFC, 24, 2024: Temperature controlled booth, 25, 2025: Gas supplying pipe, 26, 2026: Tape heater (heating element), 27, 2027: Heat insulating tape, G: Flame gas flow

The invention claimed is:

1. A method for manufacturing a glass-fine-particle-deposited body, the method comprising:
heating and vaporizing a liquid glass source material placed in a source material container to form one glass source material gas;
introducing the glass source material gas to a burner for producing glass-fine-particles from the source material container through a pipe having an inner diameter not less than 2.7 mm and not more than 19 mm, a Reynolds number of the glass source material gas flowing in the pipe from the source material container to the burner controlled to 2,000 or more;
spouting the glass source material gas from the burner for producing glass-fine-particles; and
depositing glass fine particles produced by a flame decomposition reaction of the glass source material gas on a starting rod in a reaction container to prepare a glass-fine-particle-deposited body, during the depositing step, a region of one third or less of a longitudinal direction from an end part at a pipe side in the burner for producing glass-fine-particles is controlled to a temperature of 200° C. or higher by the heating element, wherein
at least a part of the pipe from the source material container to the burner for producing glass-fine-particles in the deposition step is temperature-controlled by a heating element to a temperature of 200° C. or higher and so that a burner side has a higher temperature than a source material container side and temperature gradient of said at least part of the pipe becomes 5° C./m or more, and
a plurality of pipes along a central axis of the burner for producing glass-fine-particles are formed in the burner for producing glass-fine-particles, and the glass source material gas is supplied into one of the plurality of pipes which is provided at an innermost side of the central axis.

2. The method for manufacturing a glass-fine-particle-deposited body according to claim 1, wherein at least a part of the pipe from the source material container to the burner for producing glass-fine-particles in the deposition step is temperature-controlled by a heating element so that the burner side has a higher temperature than the source material container side and temperature gradient of said at least part of the pipe becomes 15 ° C./m or more.

3. The method for manufacturing a glass-fine-particle-deposited body according to claim 1, wherein at least a part of the pipe from the source material container to the burner for producing glass-fine-particles in the deposition step is temperature-controlled by a heating element so that the burner side has a higher temperature than the source material container side and temperature gradient of said at least part of the pipe becomes 25° C./m or more.

4. The method for manufacturing a glass-fine-particle-deposited body according to claim 1, wherein the particle diameter of the glass fine particles in the deposition step is controlled to 10 (nm) or more and the glass fine particles are combined in the flame of the burner for producing glass-fine-particles to make the mass of the combined particle groups $1.8 \times 10^{-17}$ (g) or more.

5. The method for manufacturing a glass-fine-particle-deposited body according to claim 1, wherein the temperature of the glass source material gas to be charged into the burner for producing glass-fine-particles in the deposition step is kept at 200° C. or higher, the glass source material gas is chemically changed to silicon oxide gas within 700 mm from the glass source material gas-spouting port of the burner for producing glass-fine-particles, and also partial pressure of the chemically changed silicon oxide gas is controlled to saturated vapor pressure of the silicon oxide gas or higher at the position of 20 mm from the glass source material gas-spouting port of the burner for producing glass-fine-particles.

6. The method for manufacturing a glass-fine-particle-deposited body according to claim 5, wherein the partial pressure of the chemically changed silicon oxide gas is controlled to 1.5 times the saturated vapor pressure of the silicon oxide gas at the position of 20 mm from the glass source material gas-spouting port of the burner for producing glass-fine-particles, in the deposition step.

7. The method for manufacturing a glass-fine-particle-deposited body according to claim 1, wherein the Stokes number of the glass fine particles produced by the burner for producing glass-fine-particles is controlled to 0.5 or more.

8. The method for manufacturing a glass-fine-particle-deposited body according to claim 1, wherein the heating element is a tape heater.

9. A method for manufacturing a glass base material,
a glass-fine-particle-deposited body being manufactured by the method for manufacturing a glass-fine-particle-deposited body according to claim 1 and
the glass base material being manufactured via a transparency-imparting step in which the glass-fine-particle-deposited body prepared in the deposition step is heated to impart transparency.

10. The method for manufacturing a glass base material according to claim 9, wherein the glass-fine-particle-deposited body is manufactured by the OVD method, the VAD method, or the MMD method in the deposition step and the glass base material is manufactured via the transparency-imparting step.

* * * * *